United States Patent
Shi

(10) Patent No.: US 9,521,068 B2
(45) Date of Patent: Dec. 13, 2016

(54) FORWARDING PACKETS

(71) Applicant: Hangzhou H3C Technologies Co., Ltd., Hangzhou, Zhejiang (CN)

(72) Inventor: Hongshu Shi, Beijing (CN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/402,685

(22) PCT Filed: Oct. 16, 2013

(86) PCT No.: PCT/CN2013/085320
§ 371 (c)(1),
(2) Date: Nov. 20, 2014

(87) PCT Pub. No.: WO2014/059931
PCT Pub. Date: Apr. 24, 2014

(65) Prior Publication Data
US 2015/0156108 A1    Jun. 4, 2015

(30) Foreign Application Priority Data

Oct. 16, 2012   (CN) .......................... 2012 1 0392333

(51) Int. Cl.
*H04L 12/707*   (2013.01)
*H04L 12/24*    (2006.01)
(Continued)

(52) U.S. Cl.
CPC ............. *H04L 45/22* (2013.01); *H04L 12/185* (2013.01); *H04L 12/4633* (2013.01);
(Continued)

(58) Field of Classification Search
None
See application file for complete search history.

(56) References Cited

U.S. PATENT DOCUMENTS

2006/0187950 A1 * 8/2006 Bou-Diab ............. H04L 12/185
                                                                  370/432
2008/0232375 A1 * 9/2008 Hachiya ............. H04L 12/2602
                                                                  370/392

(Continued)

FOREIGN PATENT DOCUMENTS

CN         101159696         4/2008
CN         102204223 A       9/2011
(Continued)

OTHER PUBLICATIONS

L. Martini et al., "RFC 4447: Pseudowire Setup and Maintenance Using the Label Distribution Protocol (LDP)", The Internet Society, Apr. 2006.*

(Continued)

*Primary Examiner* — Faruk Hamza
*Assistant Examiner* — Cassandra Decker
(74) *Attorney, Agent, or Firm* — Hewlett Packard Enterprise Patent Department

(57) ABSTRACT

A service instance in a BEB device is allocated B-VLANs. Each of the B-VLANs may be mapped to a different ECT algorithm. For each B-VLAN of the service instance, BEB device calculates a forwarding path between the BEB device and a remote BEB device to obtain different forwarding paths for different B-VLANs of the service instance. The BEB device forwards a data flow in a first forwarding path of the service instance, and switches the data flow from the first forwarding path to a second forwarding path of the service instance if a link failure is detected in the first forwarding path.

15 Claims, 12 Drawing Sheets

(51) Int. Cl.
*H04L 12/18* (2006.01)
*H04L 12/46* (2006.01)
*H04L 12/703* (2013.01)

(52) U.S. Cl.
CPC ...... *H04L 12/4658* (2013.01); *H04L 12/4662* (2013.01); *H04L 41/0668* (2013.01); *H04L 45/28* (2013.01)

(56) References Cited

U.S. PATENT DOCUMENTS

| | | | |
|---|---|---|---|
| 2009/0041023 A1* | 2/2009 | Ould Brahim | H04L 12/66 370/395.3 |
| 2009/0161584 A1* | 6/2009 | Guan | H04L 12/462 370/256 |
| 2009/0196298 A1* | 8/2009 | Sajassi | H04L 12/4658 370/395.53 |
| 2010/0103813 A1 | 4/2010 | Allan et al. | |
| 2010/0272108 A1 | 10/2010 | Mack-Crane et al. | |
| 2012/0147737 A1* | 6/2012 | Taylor | H04L 41/0663 370/219 |
| 2012/0147741 A1* | 6/2012 | Wei | H04L 12/413 370/225 |
| 2013/0279323 A1* | 10/2013 | Allan | H04L 45/28 370/225 |
| 2015/0043380 A1* | 2/2015 | Varga | H04L 45/68 370/254 |

FOREIGN PATENT DOCUMENTS

| | | |
|---|---|---|
| CN | 102413059 | 4/2012 |
| CN | 102549982 | 7/2012 |
| EP | 2001167 | 12/2008 |

OTHER PUBLICATIONS

International Search Report and Written Opinion dated Jan. 23, 2014 issued on PCT Patent Application No. PCT/CN2013/085320 dated Oct. 16, 2013, The State Intellectual Property office, P.R. China.

"IEEE 802. 1aq," From Wikipedia, the Free Encyclopedia, Oct. 7, 2012, pp. 1-20, XP055268204.

Ali Sajassi et al., "VPLS Interoperability with Provider Backbone Bridges," Jul. 11, 2011, pp. 1-34, Internet-Draft, L2VPN Working Group, IETF Trust.

Extended European Search Report, EP Application No. 13846839.2, Date: May 4, 2016, pp. 1-12.

Office Action, CN Application No. 201210392333.4, Date: Jun. 13, 2016, pp. 1-6.

Peter Ashwood-Smith, "Shortest Path Bridging," IEEE 802.1aq Tutorial and Demo, NANOG 50, Oct. 3, 2010, pp. 1-61, Huawei.

* cited by examiner

FORWARDING PACKETS

CROSS-REFERENCE TO RELATED APPLICATION

The present application is a 371 application of International Application No. PCT/CN2013/085320 filed on Oct. 16, 2013 and entitled "Forwarding Packets," which claims benefit of Chinese Patent App. No. CN 201210392333.4 filed on Oct. 16, 2012.

BACKGROUND

SPB (Shortest Path Bridging), an Ethernet standard defined in IEEE802.1aq, is an extension of MSTP (Multiple Spanning Tree Protocol) aiming at constructing a large-scale non-blocking flat layer-2 network. SPB adopts SPB-IS-IS (Intermediate System to Intermediate System) to share link states in the network. Nodes in the network calculate the shortest paths between the nodes in parallel to avoid instability and low utilization ratio of some links resulting from the Spanning Tree Protocol (STP).

IEEE802.1aq defines two SPB modes, i.e., a VLAN mode (SPBV (SPB VLAN Mode)) and an M-in-M (Mac-in-Mac) mode (SPB MAC Mode). The SPBM (Shortest Path Bridging-MAC) mode inherits a packet encapsulation format defined in IEEE 802.1 ah and the multi-instance concept, and defines a new control plane and a new forwarding scheme for the data plane. SPB-IS-IS is used for studying link state information, synchronizing the link state information throughout the network, and calculating forwarding paths. SPBM is a technique for layer-2 Virtual Private Networks) (VPN), and has a network model similar to the M-in-M network model defined in IEEE 802.1ah.

BRIEF DESCRIPTION OF THE DRAWINGS

Features of the present disclosure are illustrated by way of example and not limited in the following figure(s), in which like numerals indicate like elements, in which.

DETAILED DESCRIPTIONS

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Quantities of an element, unless specifically mentioned, may be one or a plurality of, or at least one.

Figure 1:
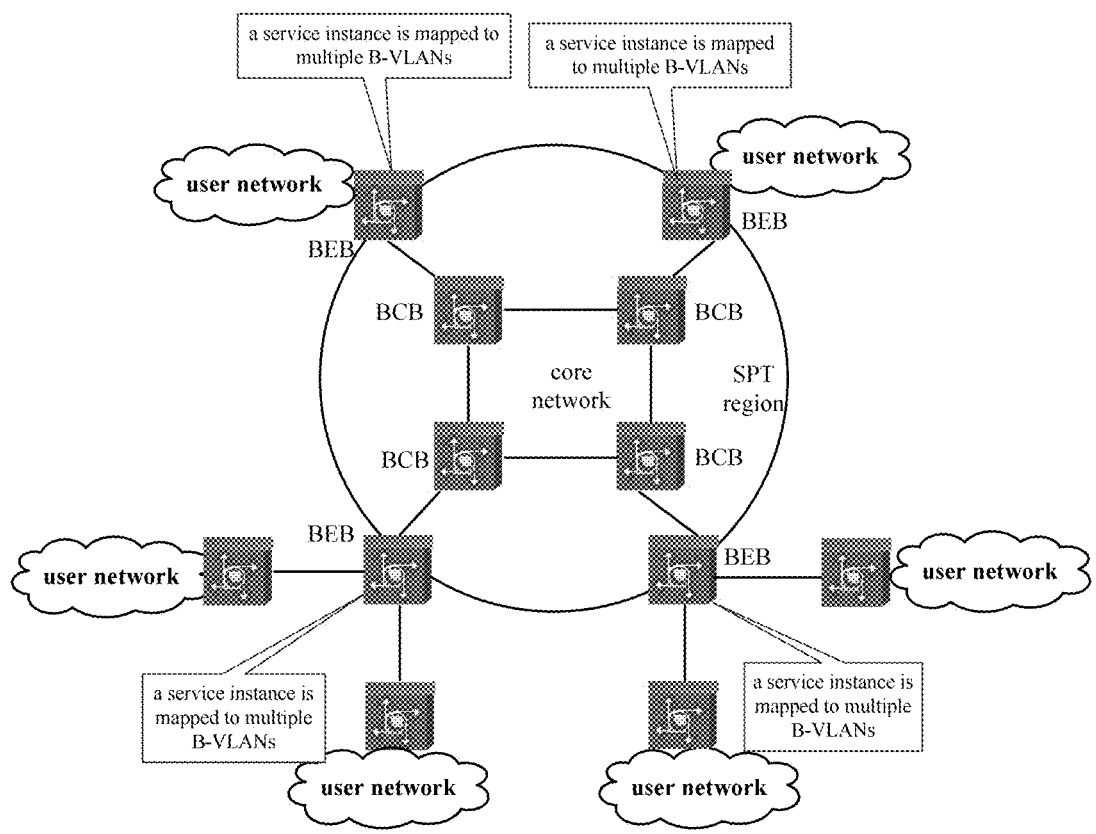
FIG. 1 is a schematic diagram illustrating a network model of an SPBM network according to an example of the present disclosure.

In some examples, in an SPBM network, a backbone network is mainly composed of devices, such as BEB devices, BCB devices and the like, and backbone links between the devices as shown in FIG. 1.

The following is an introduction to technical terms mentioned in the following description.

BEB (Backbone Edge Bridge) is an edge device of a backbone network and is similar to a PE (Provider Edge) device in an MPLS (Multi-Protocol Label Switching) network. A BEB device performs M-in-M encapsulation on packets from a user network, sends the M-in-M packet to the backbone network, or decapsulates an M-in-M packet from the backbone network and sends the packet to the user network.

BCB (Backbone Core Bridge) is a core device in the backbone network, and is similar to a P (Provider) device in an MPLS network. A BCB device forwards M-in-M packets based on B-MAC (Backbone MAC) and B-VLAN (Backbone VLAN). A BCB device forwards packets and learns MAC (Media Access Control) addresses in the backbone network but does not learn the large amount of MAC addresses in the user network, thereby lowering the cost of network deployment and making the backbone network more extendible.

An M-in-M packet refers to a packet having been processed through M-in-M encapsulation.

B-MAC/B-VLAN refers to an MAC address and a VLAN (Virtual Local Area Network) allocated by an operator and added into a user packet if the user packet goes through the M-in-M encapsulation. The MAC address and the VLAN allocated by the operator are referred to as B-MAC and B-VLAN respectively. In the backbone network, a BCB device forwards an M-in-M packet based on the B-MAC and the B-VLAN. B-MAC includes a source B-MAC and a destination B-MAC. If performing M-in-M encapsulation on a user packet, a BEB device takes the MAC address of the BEB device as the source B-MAC, and takes the MAC address of the destination BEB device on the other end of a SPBM tunnel as the destination B-MAC during the encapsulation.

A backbone link refers to a link between a BEB device and a BCB device, or a link between BCB devices. An access link refers to a link connecting a BEB device with a user network. A user packet from a user network is forwarded through a backbone link of a BEB device after being encapsulated into an M-in-M packet. An M-in-M packet from a backbone network is forwarded through an access link of a BEB device according to a destination MAC address after being decapsulated.

A service instance represents a type of service or a type of user in a backbone network. An I-SID (Backbone Service Instance Identifier) is a unique identifier of a service instance. In an example of the present disclosure, a service instance may be configured in a BEB device to be mapped to multiple B-VLANs.

(1) SPBM Data Plane

SPBM inherits the encapsulation format of M-in-M packet defined in IEEE 802.1 ah. I Information such as a service instance, a B-VLAN tag, a B-MAC address is added into the outer layer of an original Ethernet packet of a user, which is used by the backbone network in forwarding the M-in-M packet obtained by the encapsulation.

B-DA (Backbone Destination MAC address), i.e., the destination B-MAC, refers to the destination MAC address in the outer layer of the M-in-M encapsulation, and is the MAC address of the destination BEB device located at the destination end of an SPBM tunnel.

B-SA (Backbone Source MAC address), i.e., the source B-MAC, refers to the source MAC address in the outer layer of the M-in-M encapsulation, and is the MAC address of the BEB device at the source end of an SPBM tunnel.

B-Tag (Backbone VLAN Tag), i.e., the B-VLAN Tag, refers to the VLAN Tag in the outer layer of the M-in-M encapsulation, and is used for identifying the VLAN and priority information of the packet in the backbone network. The value of a TPID (Tag Protocol Identifier) of the B-Tag is always set to be 0x88a8.

I-Tag (Backbone Service Instance Tag) refers to a service tag in M-in-M encapsulation, includes a transport priority I-PCP (priority code point), a discard priority I-DEI (drop eligible indicator) for packet processing at a BEB device, and an I-SID identifying a service instance with a TPID that is always set to be 0x88e7.

C-DA (Customer Destination MAC address) refers to an original destination MAC address of a user packet.

C-SA (Customer Source MAC address) refers to an original source MAC address of a user packet.

In some examples, a BEB device receives a user packet from a user side port connected with a user network. The BEB device looks up a forwarding table and forwards the packet by mapping the ingress port and the VLAN of the packet to a service instance. If the egress port found for the user packet is determined to be an SPBM tunnel interface, the BEB device obtains a B-Tag based on a mapping between the service instance and a B-VLAN, and performs M-in-M encapsulation on the user packet by using the I-SID, B-Tag, and B-MAC of the service instance. If a M-in-M encapsulated packet enters an SPT (Shortest Path Tree) region, a BCB device forwards the packet based on the B-MAC and the B-VLAN in the packet header. In some cases, a BCB device (1) does not dynamically learn MAC addresses in a B-VLAN, (2) discards broadcast packets whose destination MAC address is an all-F value, unicast packets with unknown addresses, and multicast packets with unknown addresses, and (3) performs RPF (Reverse Path Forwarding) check based on B-SA and B-VLAN for an ingress packet (i.e., the packet is received by the BCB device) to prevent loops. Forwarding table entries in a B-VLAN may include unicast table entries and multicast table entries that are both configured by the control plane through the SPB-IS-IS protocol. A backbone link allows data in a B-VLAN to pass through.

(2) SPBM Control Plane

A control plane device uses the SPB-IS-IS protocol to learn and configure forwarding table entries of an SPBM in a B-VLAN. SPB-IS-IS has the following functions.

1. Establishing IS-IS neighbors between SPB bridges, performing fast update and synchronization of a link state database.

2. Performing notification of I-SID and load-balancing algorithm.

3. Performing parallel calculation of SPT at all nodes, and issuing forwarding table entries to the data plane.

According to IS-IS, each node may generate an LSP (Link State PDU (Protocol Data Unit)). The LSP includes all link state information of the node and correspondence between B-MAC/B-VLAN and I-SID. The link state information includes links of the node, the ID and cost of each link, an ECT (Equal Cost Tree) algorithm, and so on. If all of the nodes in a network have received LSP information of other nodes, each of the nodes starts calculating an SPT, generates and issues forwarding table entries to the data plane. The data plane processes packets based on the forwarding table entries.

Figure 2:
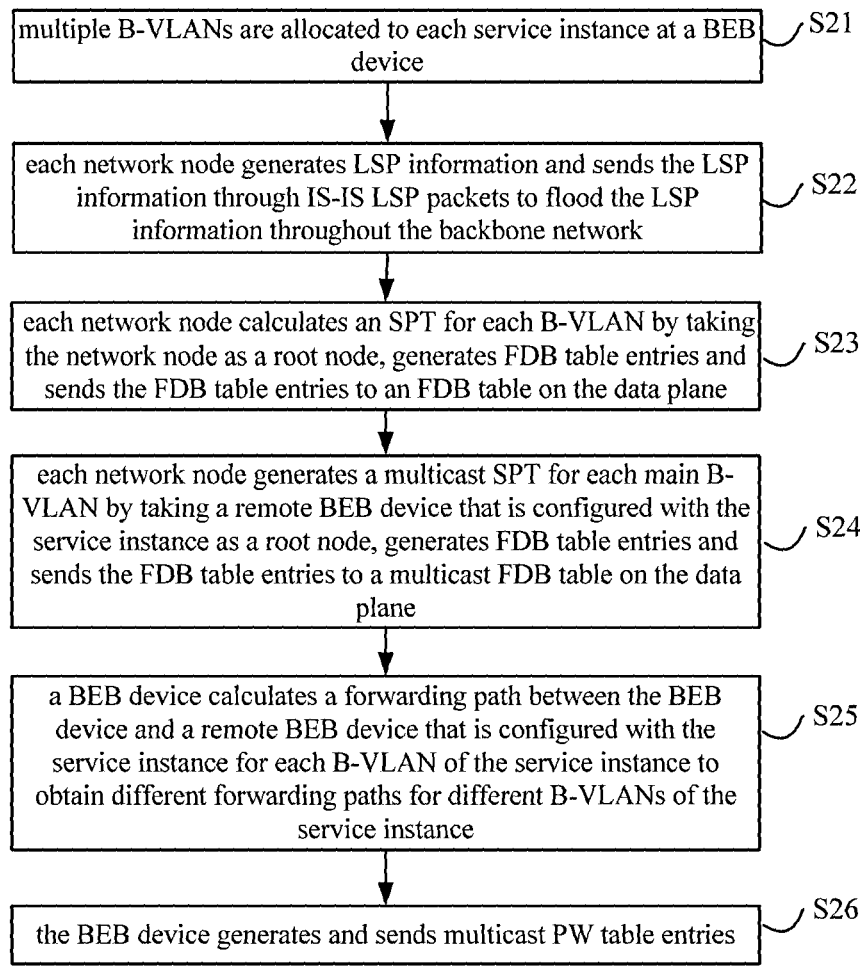
FIG. 2 is a flowchart illustrating a method for forwarding packets according to an example of the present disclosure.

As shown in FIG. 2, an example method may include the following procedures.

I. Establishing Multiple Forwarding Paths for a Service Instance

In block S21, multiple (i.e., at least two) B-VLANs are allocated to each service instance (which is identified by an I-SID) at a BEB device. In some examples, the B-VLANs may all be main B-VLANs, i.e., there are no main and backup B-VLANs in those B-VLANs. In other examples, the B-VLANs may include a main B-VLAN and a backup B-VLAN. For example, there may be one main B-VLAN and one backup B-VLAN, or multiple main B-VLANs and one backup B-VLAN, or one main B-VLAN and multiple backup B-VLANs, multiple main B-VLANs and multiple backup B-VLANs, and so on. The B-VLANs may be allocated by explicit configuration (e.g., manually configuring the B-VLANs), or be included implicitly (i.e., all B-VLANs are adopted by default). In some examples, the B-VLANs are included implicitly if a B-VLAN is specified for a service instance whose I-SID is 100 and other B-VLANs are regarded as backup B-VLANs of the service instance.

An example of explicit configuration is as follows.
vsi aaa minm i-sid 100
sbpm bvlan 20, 22, 23 # the main B-VLANs of service instance I-SID 100 are B-VLANs 20, 22 and 23
spbm bvlan 21 backup # the backup B-VLAN of service instance I-SID 100 is B-VLAN 21

In some implementations, since service instances, i.e., I-SIDS, are configured in BEB devices and not in BCB devices, the multiple B-VLANs are configured in BEB devices for each service instance and not in BCB devices.

In addition, the multiple B-VLANs may be mapped to different ECT algorithms in all network nodes (including BEB devices and BCB devices) in the backbone network to direct different B-VLANs of one service instance to different forwarding paths. For example:
ect 1 bvlan 20 # mapping B-VLAN 20 to ECT algorithm ect 1
ect 2 bvlan 21 # mapping B-VLAN 21 to ECT algorithm ect 2
ect 3 bvlan 22 # mapping B-VLAN 22 to ECT algorithm ect 3
ect 4 bvlan 23 # mapping B-VLAN 23 to ECT algorithm ect 4

A BEB device may receive configuration information of a service instance allocated to the BEB device, and configure the service instance. The configuration information may include at least two B-VLANs allocated to the service instance and an ECT algorithm mapped to each B-VLAN. Each B-VLAN is mapped to an ECT algorithm, and different B-VLANs are mapped to different ECT algorithms. One B-VLAN is mapped to the same ECT algorithm on all of the network nodes formed by BEB devices and BCB devices in the network.

In block S22, each network node in the backbone network generates LSP information of the network node, sends the LSP information in an IS-IS LSP packet to flood the LSP information throughout the backbone network.

Figure 3:
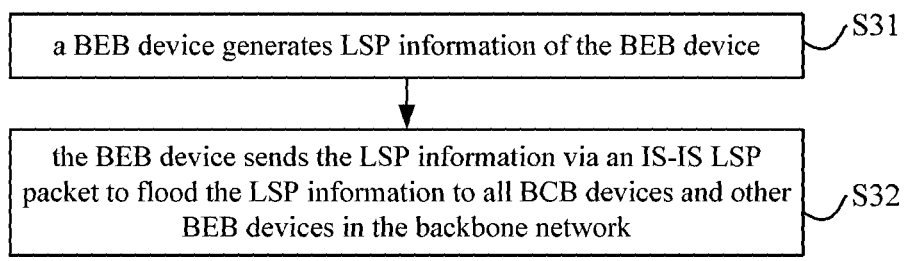
FIG. 3 is a flowchart illustrating a process of a BEB (Backbone Edge Bridge) device providing LSP information according to an example of the present disclosure.

In an example, the process of sending LSP information by a BEB device may be as shown in FIG. 3, which may include the following procedures.

In block S31, the BEB device generates LSP information. The LSP information may include each service instance in the BEB device, B-VLANs allocated to each service instance, and an ECT algorithm mapped to each B-VLAN of each service instance, such as I-SIDS and multiple B-VLANs allocated to each I-SID, an ECT algorithm mapped to each B-VLAN of each I-SID, and mappings that associate the I-SID with the multiple B-VLANs, and the ECT algorithms.

In block S32, the BEB device sends the LSP information in an IS-IS LSP packet to flood the LSP information to all of BCB devices and other BEB devices in the backbone network.

The BEB device may also receive IS-IS LSP packets from BCB devices and other BEB devices in the backbone network that carry respective LSP information, and store the IS-IS LSP packets.

The mappings that associate an I-SID with multiple B-VLANs allocated to the I-SID may be loaded in an ISID-ADDR sub-TLV (Type, Length, Value) of an IS-IS LSP packet. Table 1 shows an example format of an ISIS-ADDR sub-TLV.

TABLE 1

Format of ISIS-ADDR sub-TLV

|  |  | Octet | Length |
|---|---|---|---|
|  | Type | 1 | 1 |
|  | Length | 2 | 1 |
|  | B-MAC Address | 3-8 | 6 |
|  | Reserved | 9 | 4 bits |
|  | Base VID | 9-10 | 12 bits |
| I-SID | T | 11 | 1 bits |
| Tuple 1 | R | 11 | 1 bits |
|  | reserved | 11 | 6 bits |
|  | I-SID | 12-14 | 3 |
|  | . . . |  |  |
| I-SID | T | (4n + 7) | 1 bits |
| Tuple n | R | (4n + 7) | 1 bits |
|  | reserved | (4n + 7) | 6 bits |
|  | I-SID | (4n + 8) – (4n + 10) | 3 |

In some examples, if an I-SID is mapped to multiple B-VLANs, an IS-IS LSP packet may include multiple ISID-ADDR sub-TLVs. For example, if I-SID 100 is mapped to B-VLANs 20, 21, 22 and 23, an IS-IS LSP packet may include an ISID-ADDR sub-TLV having a Base VID of 20. The ISID-ADDR sub-TLV includes sub items of I-SID 100. Meanwhile, the IS-IS LSP packet may also include ISID-ADDR sub-TLVs whose Base VIDs are 21, 22 and 23 respectively. Each of the ISID-ADDR sub-TLVs may also include sub items of I-SID 100. A Flag R in each I-SID Tuple that includes a sub item of I-SID 100 in the four ISID-ADDR sub-TLVs may be set to be 1, indicating it is capable of receiving packets of the I-SID. A Tag T value is decided by whether or not the B-VLAN identified by a Base VID corresponding to the Tag T is a main B-VLAN and by a multicast replication mode adopted by the service instance of I-SID 100. If the multicast replication mode is head-end replication, T is 0. If the multicast replication mode is tandem replication and the B-VLAN identified by the Base VID corresponding to the T tag is a main B-VLAN, T is 1. If the multicast replication mode is tandem replication and the B-VLAN identified by the Base VID corresponding to the T tag is a backup B-VLAN, T is 0. The head-end replication mode refers to a multicast source that generates multiple packet copies that are sent to multicast destination devices. The tandem replication mode refers to a multicast source generating one copy of a packet, and branching devices on the multicast path generate multiple copies of the packet and send the copies to the branches.

Figure 4:
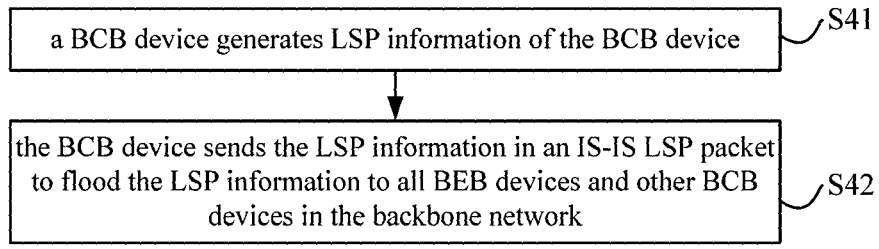
FIG. 4 is a flowchart illustrating a process of a BCB (Backbone Core Bridge) device providing LSP information according to an example of the present disclosure.

An example process of sending LSP information by a BCB device may be as shown in FIG. 4, which may include the following procedures.

In block S41, the BCB device generates LSP information of the BCB device. The LSP information may include each B-VLAN in the BCB device and an ECT algorithm mapped to each B-VLAN.

In block S42, the BCB device sends the LSP information in an IS-IS LSP packet to flood the LSP information to all of BEB devices and other BCB devices in the backbone network.

The BCB device may also receive IS-IS LSP packets from BEB devices and other BCB devices in the backbone network that carry respective LSP information, then stores the IS-IS LSP packets.

The LSP information generated by a BCB device or a BEB device may also include link state information and B-MAC of the device.

Referring back to FIG. 2, in block S23, each network node calculates a unicast SPT for each B-VLAN by taking the network node as the root node and using the ECT algorithm mapped to the B-VLAN based on LSP information of the whole backbone network, e.g., LSP information of the network node and received LSP information. Thus the different B-VLANs of the service instance have different forwarding paths. Each network node generates and issues FDB (Forwarding Database) table entries to an FDB table on the data plane.

In an example, the process of calculating a unicast SPT for each service instance performed by each BEB device may include the BEB device calculating a unicast SPT for each B-VLAN by using the ECT algorithm mapped to the B-VLAN and taking the BEB device as the root node based on LSP information of the whole backbone network including the LSP information of the network node and the received LSP information, thereby determining an egress port to each network node, e.g., to each BEB device and to each BCB device. In some cases, the calculation of a unicast SPT may be carried out for each B-VLAN. In some examples, one B-VLAN may at the same time belong to multiple service instances, these multiple service instances may all use the same unicast SPT.

After calculating the unicast SPT, the BEB device may generate unicast FDB table entries corresponding to the B-VLAN, and issue the unicast FDB table entries to a unicast FDB table in the BEB device. Since the BEB device may generate and issue unicast PW (Pseudo Wire) table entries subsequently in block S35 and the unicast PW table entries may include content of the unicast FDB table entries, the BEB device may skip this procedure of generating and issuing the unicast FDB table entries. However, either may be performed in different implementations.

Figure 5:
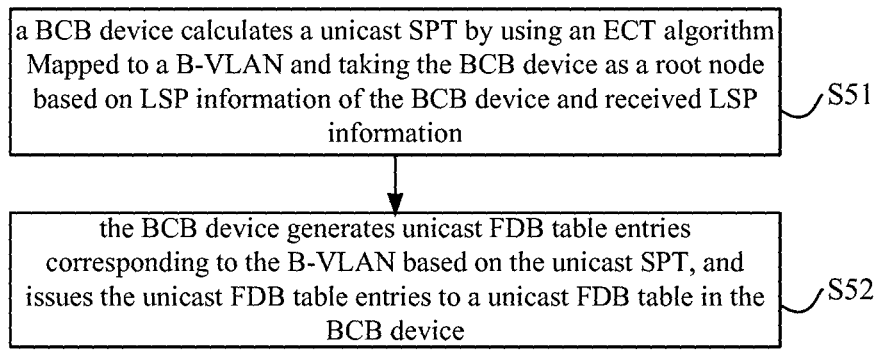
FIG. 5 is a flowchart illustrating a process of a BCB device generating an FDB (Forwarding Database) table entry according to an example of the present disclosure.

In some examples, as shown in FIG. 5, each BCB device may perform the following procedures for each B-VLAN.

In block S51, a BCB device calculates a unicast SPT by using an ECT algorithm mapped to the B-VLAN and by taking the BCB device as the root node based on LSP information of the BCB device and received LSP information, thereby determining an egress port to each network node, e.g., a BEB device, or a BCB device.

In block S52, the BCB device generates a unicast FDB table entry corresponding to the B-VLAN based on the unicast SPT obtained, and issues the unicast FDB table entry to a unicast FDB table in the BCB device. Each FDB table entry may include a B-DMAC (i.e., a B-MAC address of a network device), a B-VLAN ID, and an egress port (e.g., an egress port to the network device in the B-VLAN).

Figure 6:
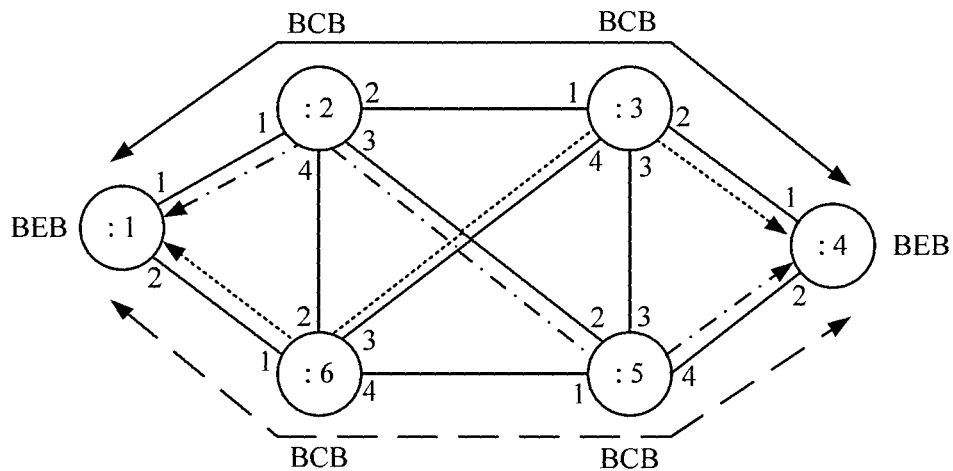
FIG. 6 is schematic diagram illustrating an SPBM core network according to an example of the present disclosure.

FIG. 6 is an example of a possible network structure of a backbone network. In FIG. 6, each circle represents a node, and a number in a circle represents the sequence number of the node. Network nodes in FIG. 6 include nodes 1 to 6. Nodes 1 and 4 are BEB devices, and nodes 2, 3, 5, 6 are BCB devices. In FIG. 6, a node's interface to a link between the node and an adjacent node is referred to by the number at the local end of the link. In this example, a service instance is allocated with 4 B-VLANs, e.g., B-VLANs 20, 21, 22 and 23. Each network node obtains that the forwarding path between node 1 and node 4 in B-VLAN 20 is 1-2-3-4, the forwarding path between node 1 and node 4 in B-VLAN 21 is 1-6-5-4, the forwarding path between node 1 and node 4 in B-VLAN 22 is 1-2-5-4, and the forwarding path between node 1 and node 4 in B-VLAN 23 is 1-6-3-4.

For example, if the B-MAC of node 1 is 0-0-1, the B-MAC of node 4 is 0-0-4, a possible unicast FDB table in each of nodes 2, 3, 5 and 6 may be as shown in Tables 2-5. In the tables, "if" is an abbreviation of "interface".

TABLE 2

Unicast FDB table in node 2

| B-DA (i.e., B-DMAC) | B-VLAN | egress port |
| --- | --- | --- |
| 0-0-1 | 20 | if-1 |
| 0-0-4 | 20 | if-2 |
| 0-0-1 | 22 | if-1 |
| 0-0-4 | 22 | if-3 |

TABLE 3

Unicast FDB table in node 3

| B-DA | B-VLAN | egress node |
| --- | --- | --- |
| 0-0-1 | 20 | if-1 |
| 0-0-4 | 20 | if-2 |
| 0-0-1 | 23 | if-4 |
| 0-0-4 | 23 | if-2 |

TABLE 4

Unicast FDB table in node 5

| B-DA | B-VLAN | egress port |
| --- | --- | --- |
| 0-0-1 | 22 | if-2 |
| 0-0-4 | 22 | if-4 |
| 0-0-1 | 21 | if-1 |
| 0-0-4 | 21 | if-4 |

TABLE 5

Unicast FDB table in node 6

| B-DA | B-VLAN | egress port |
| --- | --- | --- |
| 0-0-1 | 23 | if-1 |
| 0-0-4 | 23 | if-3 |
| 0-0-1 | 21 | if-1 |
| 0-0-4 | 21 | if-4 |

FDB table entries for B-DA being nodes 2, 3, 5, 6 are omitted in Tables 2-5.

After receiving a Mac-in-Mac packet, the BCB device may forward the packet by using the FDB table in the BCB device based on a destination B-MAC (i.e., B-DA) and a B-VLAN in the Mac-in-Mac packet.

Referring back to FIG. 2, in block S24, based on the LSP information of the whole backbone network, each network node calculates a multicast SPT for each main B-VLAN by using an ECT algorithm mapped to the main B-VLAN and taking each remote network node that has the same service instance as the root node. Thus the different B-VLANs of the service instance take different forwarding paths. Each network node generates and issues multicast FDB table entries to a multicast FDB table on the data plane. The calculation of the multicast SPT and issuing of FDB table entries corresponding to the SPT may not be performed for backup B-VLANs. If there is no main-backup relation among the multiple B-VLANs of a service instance, the multiple B-VLANs may all be regarded as main B-VLANs.

In some examples, the manner of determining a root node may include, if a tag T equal to one (T=1) is included in an I-SID Tuple in an ISID-ADDR sub-TLV of an IS-IS LSP packet received by a node from a BEB device (e.g., the node 1 in FIG. 6), the B-VLAN identified by the Base VID in the ISID-ADDR sub-TLV (e.g., the B-VLAN 20) is determined to be the main B-VLAN of the I-SID (e.g., 100) included in the I-SID Tuple. That is, the BEB device (i.e., node 1 in this example) is the root node used in calculating a multicast SPT for I-SID 100.

In an example, main-backup relationships may exist in B-VLANs of a service instance, e.g., there may be one main B-VLAN and one backup B-VLAN, or multiple main B-VLANs and one backup B-VLAN, or multiple main B-VLANs and multiple backup B-VLANs, or one main B-VLAN and multiple backup B-VLANs. In some examples, each BEB may perform the following calculations of a multicast SPT for each service instance (e.g., each service instance in the BEB device and each service instance in other BEB devices): the BEB device calculates a multicast SPT for each main B-VLAN of the service instance by using an ECT algorithm mapped to the main B-VLAN and taking each remote BEB device that is configured with the service instance as the root node based on LSP information of the BEB device and received LSP information, thereby determining an egress port connected to each remote BEB device. One or multiple egress ports may be obtained. After calculating the multicast SPT, the BEB device may generate multicast FDB table entries corresponding to the main B-VLAN based on the multicast SPT obtained, and issue the multicast FDB table entries to a multicast FDB table in the BEB device. Since the BEB device may generate and issue multicast PW table entries subsequently in block S36 and the multicast PW table entry may include content of the multicast FDB table entries, the BEB device may skip this procedure of generating and issuing the multicast FDB table entries. However, either may be performed in different implementations.

Figure 7:
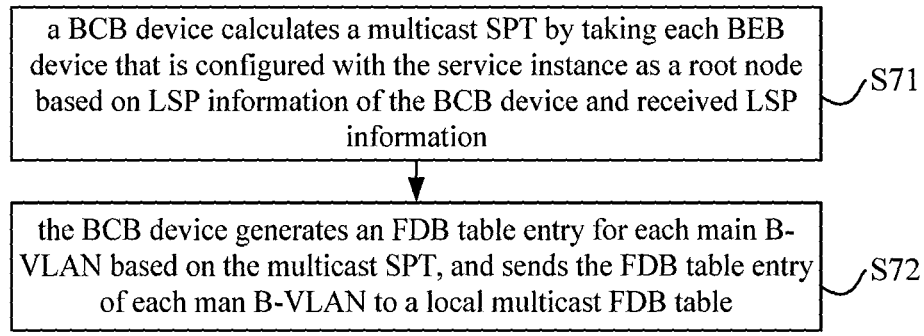
FIG. 7 is a flowchart illustrating a process of a BCB device generating an FDB table entry according to an example of the present disclosure.

In some examples, if B-VLANs of a service instance include a main B-VLAN and a backup B-VLAN, each BCB device may perform the procedures as shown in FIG. 7 for each main B-VLAN in examples of the present disclosure.

In block S71, a BCB device may calculate a multicast SPT by using an ECT algorithm mapped to the main B-VLAN and taking each BEB device configured with the service instance as the root node based on LSP information of the BCB device and received LSP information, thereby determining an egress port connected to each network node (e.g., each BEB device and each BCB device).

In block S72, the BCB device may generate FDB table entries corresponding to the main B-VLAN based on the multicast SPT obtained, and issues the FDB table entries to a multicast FDB table in the BCB device. Each FDB table entry may include a B-DMAC (e.g., a multicast address of a network device), a B-VLAN ID, and an egress port (e.g., the egress port connected to the network device in the B-VLAN).

In some examples, in response to a determination that there is no main-backup relationship among the multiple B-VLANs of a service instance, the BEB device and the BCB device may calculate multicast SPTs for each B-VLAN.

Still taking the network structure shown in FIG. 6 as an example, the calculation result obtained by each network node in the backbone network according to the block S24 is the same as the unicast path obtained by the network node.

For example, if the SPSOURCEID (source node ID) of node 1 is 1, and SPSOURCEID of node 4 is 4, the multicast FDB table in nodes 2, 3, 5, 6 may be as shown in Tables 6-9.

TABLE 6

Multicast FDB table in node 2

| B-DA (i.e., B-DMAC) | B-VLAN | egress port |
|---|---|---|
| 0300-0004-0064 | 20 | if-1 |
| 0300-0001-0064 | 20 | if-2 |
| 0300-0004-0064 | 22 | if-1 |
| 0300-0001-0064 | 22 | if-3 |

TABLE 7

Multicast FDB table in node 3

| B-DA | B-VLAN | egress port |
|---|---|---|
| 0300-0004-0064 | 20 | if-1 |
| 0300-0001-0064 | 20 | if-2 |
| 0300-0004-0064 | 23 | if-4 |
| 0300-0001-0064 | 23 | if-2 |

TABLE 8

Multicast FDB table in node 5

| B-DA | B-VLAN | egress port |
|---|---|---|
| 0300-0004-0064 | 22 | if-2 |
| 0300-0001-0064 | 22 | if-4 |

TABLE 9

Multicast FDB table in node 6

| B-DA | B-VLAN | egress port |
|---|---|---|
| 0300-0004-0064 | 23 | if-1 |
| 0300-0001-0064 | 23 | if-3 |

It should be noted that, for the head-end replication mode, there is no such processes of calculating a multicast SPT and issuing the FDB table entries. If an I-SID adopts the head-end replication mode, the tag T in the ISID-ADDR sub-TLV is set to zero (0).

In the 0300-0001-0064 in Tables 6-9, the "03" is a multicast ID indicating the address is a multicast address, the "000001" is the source node ID, and the "0064" is the I-SID. For example, if node 1 sends a multicast packet, the source B-MAC in the packet is set to be the B-MAC of node1, i.e., 0-0-1, and the destination B-MAC is set to be 0300-0001-0064.

After a BCB device receives a Mac-in-Mac packet, the BCB device may forward the packet according to an FDB table in the BCB device based on a destination B-MAC and a B-VLAN in the received Mac-in-Mac packet.

Multiple egress ports may be found, in which case multiple copies of the Mac-in-Mac packet may be generated and sent through the multiple egress ports.

Referring back to FIG. 2, in block S25, for each B-VLAN of the service instance, the BEB device may calculate a forwarding path between the BEB device and each remote BEB device that is configured with the same service instance by using an ECT algorithm mapped to the B-VLAN and based on LSP information of the whole backbone network, thereby obtaining different forwarding paths for different B-VLANs of the service instance.

In an example of the present disclosure, the BEB device may allocate a unicast PW group for each remote BEB device that is configured with the service instance. Thus, a unicast PW group corresponds to a remote BEB device of a service instance. If a service instance has multiple remote BEB devices, multiple unicast PW groups may be generated for the service instance. Each unicast PW group may include at least one unicast PW. That is, each P2P (Point-to-Point) service instance corresponds to a unicast PW group, and each P2MP (Point-to-Multipoint) service instance corresponds to multiple unicast PW groups. In some examples, the number of unicast PW groups of a P2MP service instance is the same with the number of remote BEB devices that is configured with the P2MP service instance. If a unicast PW group includes multiple unicast PWs, load-balancing may be applied among main PWs in the unicast PWs, and a backup PW may be a backup path of the main PWs. In some examples, the main PWs may be used for transmitting and receiving, and the backup PW is to receive but not send data. A unicast PW group may correspond to multiple point-to-point forwarding paths.

Besides allocating a unicast PW group for each remote BEB device, the BEB device may also automatically generate a multicast PW group for each service instance. In some examples, a service instance has only one multicast PW group. One multicast PW group may include at least one multicast PW (i.e., one or multiple multicast PWs). A multicast PW Group ID may be a fixed value, e.g., 0 may be used for representing a PW Group ID. If a multicast PW group includes multiple multicast PWs, load-balancing may be applied among main PWs in the multicast PWs, and there may not be a backup multicast PW on the data plane. Each multicast PW corresponds to a point-to-multi-point forwarding path.

Figure 8:
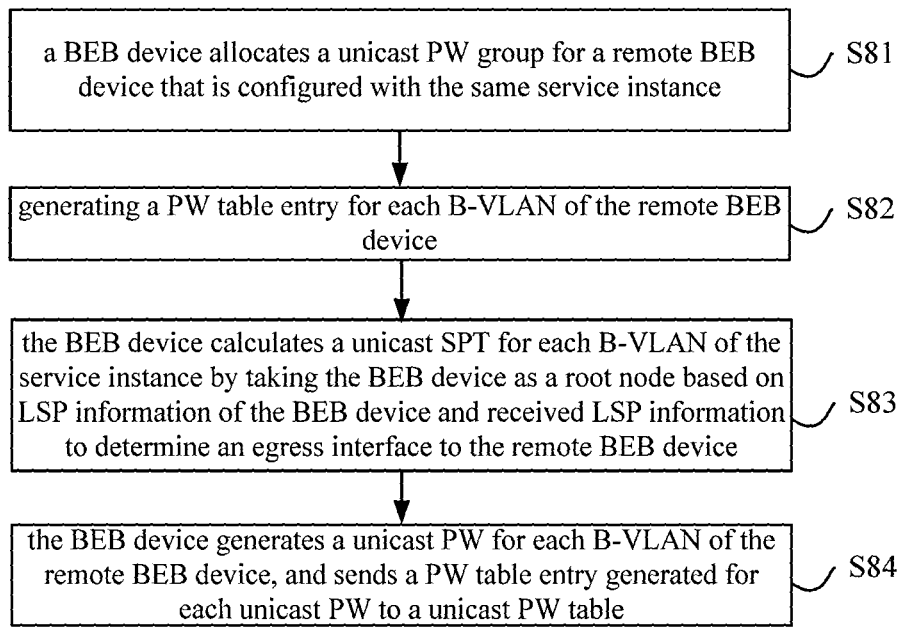
FIG. 8 is a flowchart illustrating a process of a BEB device generating a unicast PW (Pseudo Wire) table entry according to an example of the present disclosure.

In some examples, for a unicast service and each remote BEB device that is configured with the same service instance, the process of implementing the block S25 may be as shown in FIG. 8. The process may include the following procedures.

In block S81, the BEB device allocates a unicast PW group for a remote BEB device that is configured with the same service instance.

The remote BEB device may be represented by a B-MAC, and a PW group may be identified by a unique PW Group ID.

In block S82, a PW table entry is generated for each B-VLAN allocated to the service instance. At this time, the PW table entry is not complete, and lacks an egress port to the remote BEB device.

In block S83, the BEB device calculates a unicast SPT for each B-VLAN of the service instance by using an ECT algorithm mapped to the B-VLAN and taking the BEB device as the root node based on LSP information of the BEB device and received LSP information, thereby determining the egress port to the remote BEB device, e.g., determining an egress port to the remote BEB device for each B-VLAN of the service instance by using the unicast SPT obtained by the BEB device in block S23.

In block S84, the BEB device generates a unicast PW for each B-VLAN of the service instance, and issues a PW table entry generated for the unicast PW to a unicast PW table. All unicast PWs generated for the remote BEB device belong to the unicast PW group allocated for the remote BEB device. A PW table entry of each unicast PW may include a unicast PW group ID, a PW ID, a B-VLAN, and an egress port, and may optionally include a VSI INDEX, an I-SID, a B-SMAC, a B-DMAC, a FLAG, and the like.

A unicast PW generated for each B-VLAN of the service instance may be the forwarding path between the BEB device and the remote BEB device calculated for each B-VLAN of the service instance.

In response to a determination that there is a main B-VLAN and a backup B-VLAN in the multiple B-VLANs of a service instance, the BEB device may set the backup unicast PW to receive but not send data if issuing a PW table entry corresponding to the backup unicast PW generated for the backup B-VLAN to the unicast PW table; the BEB device may set the main unicast PW to send and receive data if issuing a PW table entry corresponding to the main unicast PW generated for the main B-VLAN to the unicast PW table. That is, the unicast PW corresponding to the main B-VLAN is a main unicast PW, and the unicast PW corresponding to the backup B-VLAN is a backup unicast PW. A main unicast PW is used to send and receive data, while a backup unicast PW is used to receive but not send data.

In practice, the BEB device may also determine remote BEB devices that are configured with the service instance based on LSP information of the BEB device and received LSP information before performing the procedure in block S25.

Referring to the network structure shown in FIG. 6 as an example, suppose B-VLANs 20, 22 and 23 are main B-VLANs, and B-VLAN 21 is a backup B-VLAN. Unicast PW tables in node 1 and node 4 may be as shown in Tables 10 and 11 respectively.

TABLE 10

Unicast PW table in node 1

| VSI INDEX | PW ID | PW Group ID | I-SID | B-SA (B-SMAC) | B-DA (B-DMAC) | B-VLAN ID | egress port | FLAG |
|---|---|---|---|---|---|---|---|---|
| 1 | 1 | 1 | 100 | 0-0-1 | 0-0-4 | 20 | if-1 | Ingress &Egress |
| 1 | 2 | 1 | 100 | 0-0-1 | 0-0-4 | 22 | if-1 | Ingress &Egress |
| 1 | 3 | 1 | 100 | 0-0-1 | 0-0-4 | 23 | if-2 | Ingress &Egress |
| 1 | 4 | 1 | 100 | 0-0-1 | 0-0-4 | 21 | if-2 | Egress |

TABLE 11

Unicast PW table in node 4

| VSI INDEX | PW ID | PW Group ID | I-SID | B-SA | B-DA | B-VLAN ID | egress port | FLAG |
|---|---|---|---|---|---|---|---|---|
| 1 | 1 | 1 | 100 | 0-0-4 | 0-0-1 | 20 | if-1 | Ingress &Egress |
| 1 | 2 | 1 | 100 | 0-0-4 | 0-0-1 | 22 | if-2 | Ingress &Egress |
| 1 | 3 | 1 | 100 | 0-0-4 | 0-0-1 | 23 | if-1 | Ingress &Egress |
| 1 | 4 | 1 | 100 | 0-0-4 | 0-0-1 | 21 | if-2 | Egress |

In the above tables, "Ingress" represents an ingress flag (encapsulation), and "Egress" represents an egress flag (de-capsulation).

In SPBM, VSI is used by a BEB device for allocating resources to a specific service instance. One VSI corresponds to one service instance, and a PW is a bi-directional virtual link connecting BEB devices which are configured with a VSI belonging to the same service instance.

There may be one unicast PW table in a BEB device in which unicast PW tables of different service instances are distinguished by VSI INDEX of the service instances.

In some examples, such as in Tables 10 and 11, the manner of setting a main unicast PW to send and receive data may include setting a FLAG corresponding to the main unicast PW to be "Ingress & Egress", and the manner of setting a backup unicast PW to receive data may include setting a FLAG corresponding to the backup unicast PW to be "Egress".

Figure 9:
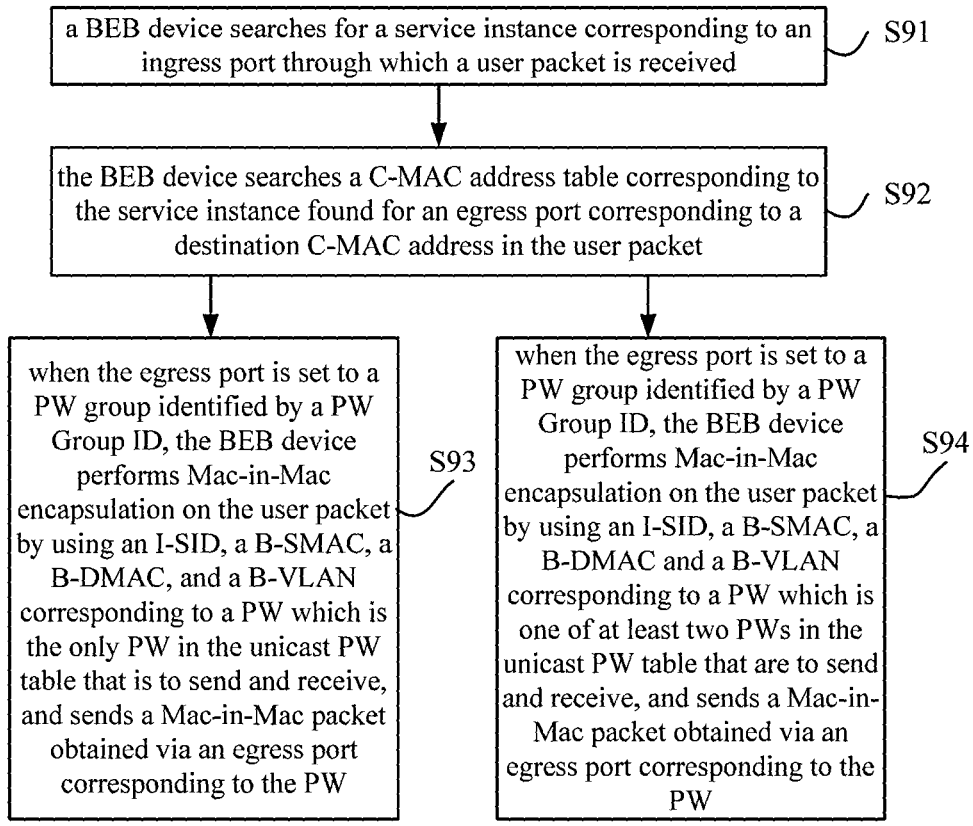
FIG. 9 is a flowchart illustrating a process of a BEB device performing Mac-in-Mac encapsulation on a user packet and forwarding the packet according to an example of the present disclosure.

In some examples, after receiving a user packet from the user network, the BEB device may perform Mac-in-Mac encapsulation on the user packet and forwarding the packet according to the process as shown in FIG. 9. The process may include the following procedures.

In block S91, the BEB device searches for a service instance corresponding to an ingress port that received the user packet.

The BEB device may store a mapping that associates an interface with a service instance, and thus may find the service instance by using the ingress port of the packet.

In block S92, the BEB device searches in a C-MAC address table corresponding to the service instance for an egress port corresponding to a C-MAC address that is consistent with a destination C-MAC address in the user packet.

This procedure includes searching for an egress port in a table entry which includes the destination C-MAC address in the user packet.

In block S93, the BEB device determines that the egress port found is a PW group identified by a PW Group ID and only one PW in the PW group is to send and receive data. For example, only one PW table entry in the unicast PW table entry satisfies the following conditions: the PW table entry includes the PW group (which is a PW Group ID in an example) found and the PW in the PW table entry is to send and receive data (which is indicated by a FLAG set to be "Ingress & Egress" in an example). In response to such a determination, the BEB device performs Mac-in-Mac encapsulation on the user packet by using an I-SID, a B-SMAC, a B-DMAC and a B-VLAN ID corresponding to the PW in the unicast PW table, and sends a Mac-in-Mac packet obtained from the encapsulation via an egress port corresponding to the PW. The egress port corresponding to the PW may be obtained from the unicast PW table or from a local FDB table.

In some implementations, if a PW is to receive but not send data, the FLAG in the PW table entry corresponding to the PW is set to be "Egress". Therefore, it may be determined whether or not a PW in a PW table entry is to send and receive data by judging whether or not the FLAG in the PW table entry includes "Ingress". A PW which belongs to a PW group found and corresponds to a FLAG including Ingress flag is searched for in the unicast PW table.

In block S94, the BEB determines that there are at least two PWs to send and receive data in the PW group (the at least two PWs have the same PW Group ID). For example, there are at least two PW table entries in the unicast PW table that satisfy the following conditions: the PW table entry includes the PW group found and the PWs in the PW table entry is to send and receive data (e.g., the FLAG in the PW table entry includes an Ingress flag). In response to such a determination, the BEB device selects a PW from the at least two PWs based on a pre-defined load-balancing rule (e.g., selecting a PW table entry from the at least two PW table entries), performs Mac-in-Mac encapsulation on the user packet by using an I-SID, a B-SMAC, a B-DMAC and a B-VLAN corresponding to the selected PW in the unicast PW table, and sends a Mac-in-Mac packet obtained from the encapsulation via an egress port corresponding to the selected PW.

The pre-defined load-balancing rule may be set in advance based on needs. For example, the load-balancing rule may involve performing Hashing calculation by taking layer-2 information of the user packet (e.g., source C-MAC+ destination C-MAC), layer-3 information or layer-4 information as the hash key, applying modulo N (N is the number of main B-VLANs of the service instance) to a Hash value obtained, and selecting a PW (or a PW table entry) corresponding to the modulo result. For example, a PW may be selected by numbering PW table entries of each remote BEB device of a service instance in a unicast PW table from 0, selecting a PW table entry whose sequence number is 1 if the modulo result is 1, e.g., selecting a PW in the PW table entry whose sequence number is 1. As such, one unicast PW in each unicast PW group may be used for transmitting the user packet. Alternatively, the PW ID may serve as the above sequence number.

Through the above process, if multiple main forwarding paths are established for a service instance, load-balancing among multiple main forwarding paths of the service instance is implemented. For example, in FIG. 6, if the network topology is stable, 4 forwarding paths are established for a service instance, 3 of which are main forwarding paths. Load-balancing is implemented among the 3 main forwarding paths for data flows of the service instance between two BEB devices.

As for multicasting, a BEB device may generate a multicast PW for each main B-VLAN of each service instance (e.g., generating multiple multicast PWs for a service instance). In response to a determination that there is main-backup relation among the multiple B-VLANs of a service instance, the BEB device may generate a PW table entry of a multicast PW corresponding to each main B-VLAN of the service instance based on the multicast SPT calculated in block S23, issue the PW table entry to a multicast PW table, and set the multicast PW to send but not receive data. Each main B-VLAN of the service instance corresponds to a multicast PW. Multicast PWs corresponding to the main B-VLANs of the service instance belong to the same PW group (e.g., the multicast PW group corresponding to the service instance), e.g., the multicast PWs may have the same PW Group ID. No multicast PW is generated for a backup B-VLAN.

Figure 10:
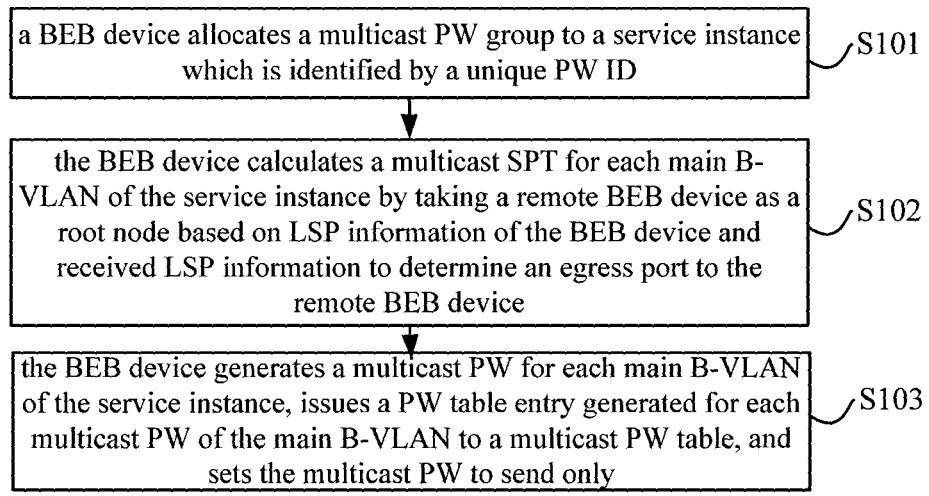
FIG. 10 is a flowchart illustrating a process of a BEB device generating a multicast PW table entry according to an example of the present disclosure.

In some examples, if a multicast replication mode of a service instance is tandem replication and there is a main B-VLAN and a backup B-VLAN in multiple B-VLANs of the service instance, the process in block S25 may include the following procedures as shown in FIG. 10 for each remote BEB device that is configured with the service instance.

In block S101, the BEB device allocates a multicast PW group for the service instance, e.g., by using a unique PW group ID.

In block S102, the BEB device calculates a multicast SPT for each main B-VLAN of the service instance by using an ECT algorithm mapped to the main B-VLAN taking a remote BEB device as a root node based on LSP information of the BEB device and received LSP information, thereby determining an egress port to the remote BEB device. The BEB device may determine an egress port to the remote BEB device corresponding to each main B-VLAN of the service instance by using the multicast SPT obtained in block S24. One or multiple egress ports to the remote BEB device may be obtained.

In block S103, the BEB device generates a multicast PW for each main B-VLAN of the service instance, issues a PW table entry of the multicast PW generated for the main B-VLAN to a multicast PW table, and sets the multicast PW to send but not receive data. The multicast PW corresponding to each main B-VLAN of the service instance belongs to the multicast PW group allocated to the service instance. The PW table entry of each multicast PW may include a multicast PW group ID, a PW ID, a B-VLAN ID and an egress port, and may also include a VSI INDEX, an I-SID, a B-SMAC, a B-DMAC and a FLAG.

In response to a determination that the multicast replication mode of a service instance is tandem replication and there is no main-backup relation among the multiple B-VLANs of the service instance, in the above block S102, the BEB device may calculate a SPT for each B-VLAN of the service instance by using an ECT algorithm mapped to the B-VLAN and taking a remote BEB device as the root node based on LSP information of the BEB device and received LSP information, thereby determining an egress port to the remote BEB device. In block S103, the BEB device may generate a multicast PW for each B-VLAN of the service instance, issue a PW table entry of the multicast PW generated for the B-VLAN to a multicast PW table, and set the multicast PW to send but not receive data. The multicast PW corresponding to each B-VLAN of the service instance belongs to the multicast PW group allocated to the service instance. Each B-VLAN of the service instance may be regarded as a main B-VLAN.

Referring to the network structure shown in FIG. 6 as an example, suppose B-VLANs 20, 22 and 23 are main B-VLANs, and B-VLAN 21 is a backup B-VLAN. The multicast PW tables in node 1 and node 4 may be as shown in Tables 12 and 13 respectively.

TABLE 12

Multicast PW table in node 1

| VSI INDEX | PW ID | PW Group ID | I-SID | B-SA | B-DA | B-VLAN | egress port | FLAG |
|---|---|---|---|---|---|---|---|---|
| 1 | 1 | 0 | 100 | 0-0-1 | 0300-00 01-0064 | 20 | if-1 | Ingress |
| 1 | 2 | 0 | 100 | 0-0-1 | 0300-00 01-0064 | 22 | if-1 | Ingress |
| 1 | 3 | 0 | 100 | 0-0-1 | 0300-00 01-0064 | 23 | if-2 | Ingress |

TABLE 13

Multicast PW table in node 4

| VSI INDEX | PW ID | PW Group ID | I-SID | B-SA | B-DA | B-VLAN | egress port | FLAG |
|---|---|---|---|---|---|---|---|---|
| 1 | 1 | 0 | 100 | 0-0-4 | 0300-00 01-0064 | 20 | if-1 | Ingress |
| 1 | 2 | 0 | 100 | 0-0-4 | 0300-00 01-0064 | 22 | if-2 | Ingress |
| 1 | 3 | 0 | 100 | 0-0-4 | 0300-00 01-0064 | 23 | if-1 | Ingress |

In the above tables, "Ingress" is a flag representing entering a tunnel, and "Egress" is a flag representing exiting a tunnel.

There is no such process of calculating and issuing a multicast PW table entry in the head-end replication mode. If an I-SID adopts the head-end replication mode, the T tag in the ISID-ADDR sub-TLV is set to 0.

In SPBM, VSI is used by a BEB device to allocate resources to a specific service instance. One VSI corresponds to one service instance, and a PW is a bi-directional virtual link connecting two BEB devices that are both configured with the VSI of the same service instance.

In practice, there may be one multicast PW table in a BEB device in which multicast PW tables of different service instances are distinguished by respective VSI INDEX of the service instances.

It can be seen from table 12 and table 13 that the manner of setting a main multicast PW to send but not receive data may include setting a FLAG corresponding to the main multicast PW to be "Ingress". There is no PW table entry for a backup multicast PW in the multicast PW table.

Figure 11:
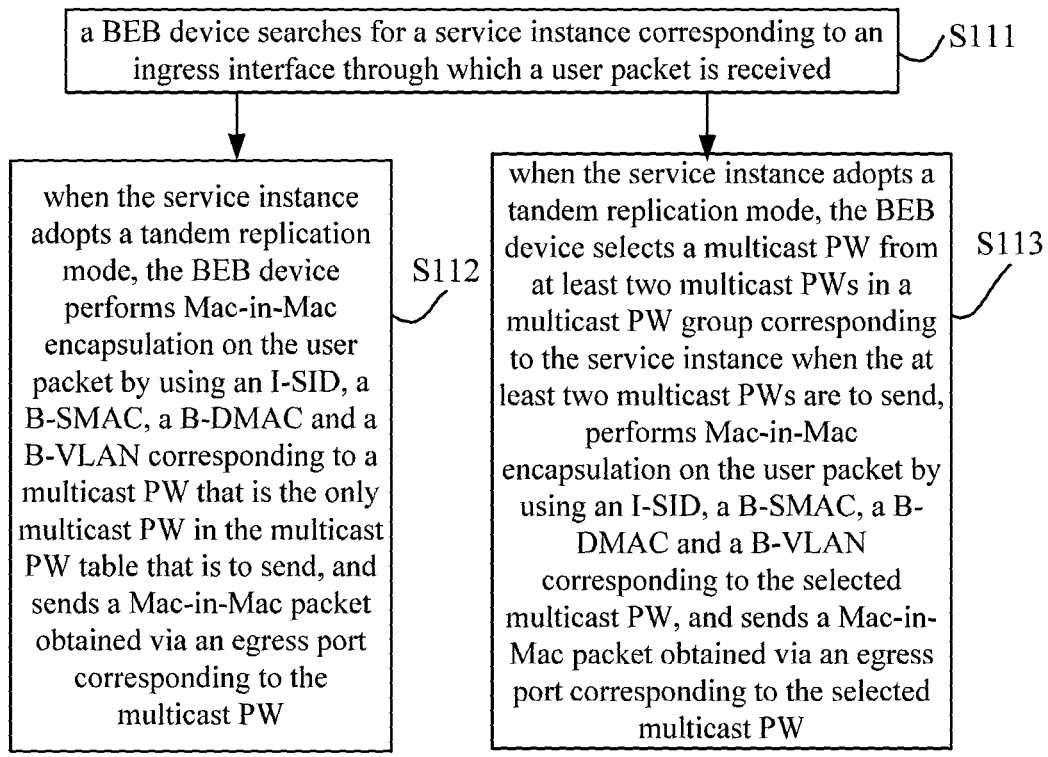
FIG. 11 is a flowchart illustrating a process of a BEB device performing Mac-in-Mac encapsulation on a user packet and forwarding the packet according to an example of the present disclosure.

In some examples, after receiving a user packet from the user network, the BEB device may perform Mac-in-Mac encapsulation on the user packet and forwarding the packet according to the process as shown in FIG. 11. The process may include the following procedures.

In block S111, the BEB device searches for a service instance corresponding to an ingress port through which the user packet is received. The user packet may be one of a broadcast packet, a multicast packet, a unicast packet with an unknown destination C-MAC address.

The destination C-MAC address is unknown means no C-MAC address in a C-MAC table corresponding to the service instance matches the destination C-MAC address.

In block S112, the BEB device determines that the service instance corresponding to the user packet adopts the tandem replication mode, and there is only one multicast PW used for sending in a multicast PW group corresponding to the service instance (e.g., only one PW table entry in the multicast PW table includes the PW Group ID of the multicast PW group corresponding to the service instance). In response to such a determination, the BEB device may perform Mac-in-Mac encapsulation on the user packet by using an I-SID, a B-SMAC, a B-DMAC and a B-VLAN corresponding to the multicast PW in the multicast PW table, and sending a Mac-in-Mac packet obtained from the encapsulation through an egress port corresponding to the multicast PW.

In block S113, the BEB device determines that the service instance corresponding to the user packet adopts the tandem replication mode, and there are at least two multicast PW to send data in a multicast PW group corresponding to the service instance (e.g., at least two PW table entries in the multicast PW table include the PW Group ID of the multicast PW group corresponding to the service instance). In response to such a determination, the BEB device may select a PW from the at least two PWs based on a pre-defined load-balancing rule, perform Mac-in-Mac encapsulation on the user packet by using an I-SID, a B-SMAC, a B-DMAC and a B-VLAN corresponding to the multicast PW in the multicast PW table, and send a Mac-in-Mac packet obtained from the encapsulation through an egress port corresponding to the multicast PW.

There may be multiple egress ports in a multicast PW table entry, and in this case, multiple copies of the Mac-in-Mac packet may be generated, and each copy is sent through one of the egress ports.

In some implementations, if a service instance has multiple main B-VLANs (there are multiple PW table entries having the PW Group ID corresponding to the service instance in the multicast PW table), various methods may be adopted to determine which main B-VLAN is to be adopted (e.g., determine the main B-VLAN whose PW table entry is to be selected) for transmitting data.

In some examples, the pre-defined load-balancing rule may be similar to the rule described with rescue to block S94 of FIG. 9.

Figure 12:
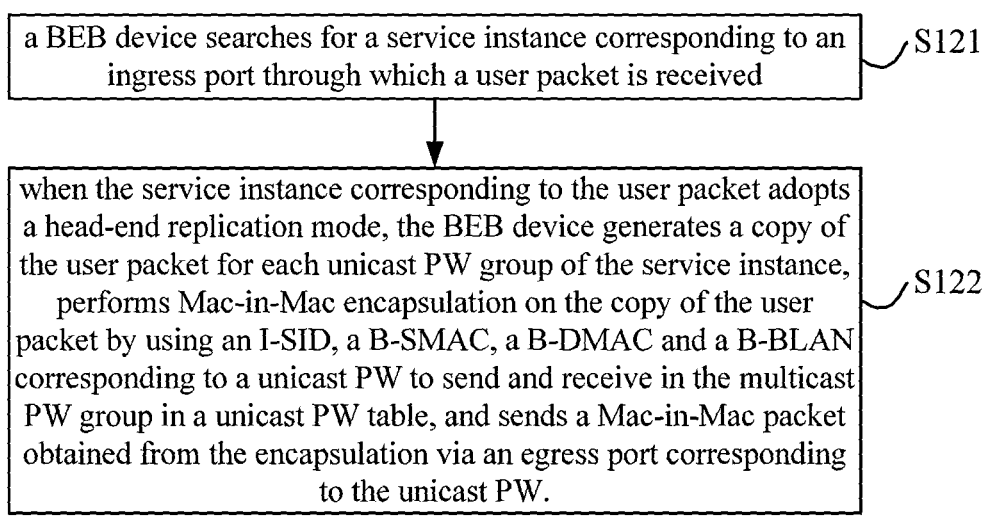
FIG. 12 is a flowchart illustrating a process of a BEB device performing Mac-in-Mac encapsulation on a user packet and forwarding the packet according to an example of the present disclosure.

If head-end replication is adopted, no multicast PW table entry may be found. In this case, unicast PW groups of the service instance are traversed to select a PW having an Ingress flag (i.e., a PW to send and receive data) from each PW group for transmission. In an example, the process may be as shown in FIG. 12, and may include the following procedures.

In block S121, the BEB device searches for a service instance corresponding to an ingress port through which the user packet is received. The user packet may be one of a broadcast packet, a multicast packet, a unicast packet with an unknown destination C-MAC address.

In block S122, in response to a determination that the service instance corresponding to the user packet adopts the head-end replication mode, the BEB device generates a copy of the user packet for each unicast PW group of the service instance, performs Mac-in-Mac encapsulation on the copy of the user packet by using an I-SID, a B-SMAC, a B-DMAC, and a B-VLAN corresponding to a unicast PW to send and receive data in the unicast PW group in the unicast PW table, and sends a Mac-in-Mac packet obtained from the encapsulation through an egress port corresponding to the unicast PW.

In response to a determination that there are at least two unicast PWs that can be used for sending and receiving in a unicast PW group of the service instance, the BEB may select one unicast PW from the at least two unicast PWs based on a pre-defined load-balancing rule.

In view of the foregoing, a data flow of a service instance may be transmitted in multiple B-VLANs, and the BEB device may send data packets by using any main B-VLAN of the service instance. According to the above blocks S91-S94, the BEB device can forward a user packet through one B-VLAN after receiving the user packet. In case of data reception, all B-VLANs of a service instance may be used to receive data packets, e.g., there are single-transmitting and multi-receiving situations in the network.

II. Learning C-MAC Addresses

Figure 13:
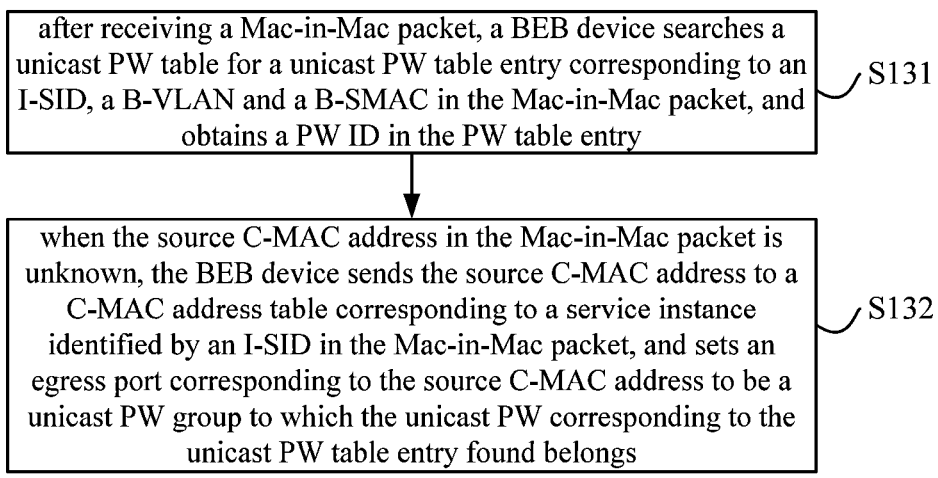
FIG. 13 is a flowchart illustrating a process of a BEB device studying a source C-MAC (Customer MAC address) address from a Mac-in-Mac packet received from a core network according to an example of the present disclosure.

In some examples, a BEB device decapsulates a Mac-in-Mac packet received from the backbone network, and learns a source C-MAC address. Generally, the address learned from a packet received from a PW is stored in a PW group to which the PW belongs. In some examples, the process may be as shown in FIG. 13, and may include the following procedures.

In block S131, a BEB devices receives a Mac-in-Mac packet, searches in a unicast PW table for a unicast PW corresponding to an I-SID, a B-VLAN, and a B-SMAC in the Mac-in-Mac packet (e.g., searching for a PW table entry which includes the I-SID, the B-VLAN, and the B-SMAC in the Mac-in-Mac packet), and obtains the PW ID in the PW table entry.

The Mac-in-Mac packet received by the BEB device may be sent by a remote BEB device via a multicast PW or a unicast PW. In some examples, no matter if the packet is sent through a multicast PW or a unicast PW, the BEB device still performs the table lookup by using the I-SID, the B-VLAN, and the B-SMAC in the Mac-in-Mac packet.

In block S132, in response to a determination that the source C-MAC address in the Mac-in-Mac packet is an unknown C-MAC address, the BEB device issues the source C-MAC address to a C-MAC address table corresponding to a service instance identified by the I-SID in the Mac-in-Mac packet, and sets an egress port corresponding to the source C-MAC address to be the unicast PW group (may be the unicast PW group ID) to which the unicast PW found in block S131 belongs.

If the egress port in the C-MAC address table is a PW group, the PW group is a unicast PW group.

There may be a time difference between the main-backup switchover performed by different BEB devices. For example, in the backbone network as shown in FIG. 6, at one moment, node 1 uses a forwarding path corresponding to B-VLAN 20 as the main path, and node 4 uses a forwarding path corresponding to B-VLAN 21 as the main path. Node 1 receives a packet from a backup forwarding path, learns the source C-MAC address in the packet, and associates the address with a PW Group.

In some examples, the learning process may be as follows. If an I-SID in a Mac-in-Mac packet is 100, node 4 may send the packet to node 1 via a unicast PW or a multicast PW of B-VLAN 21. After receiving the packet, node 1 searches in a unicast PW table for a backup unicast PW table entry corresponding to an I-SID, a B-SMAC, and a B-VLAN in the packet. Supposing the PW Group ID in the table entry is 1. Node 1 decapsulates the packet, and associates the learned source C-MAC with a corresponding PW Group ID, e.g., PW Group 1 if the C-SA (i.e., the source C-MAC) is an unknown C-MAC.

In addition, a BEB device may receive a multicast Mac-in-Mac packet from a remote BEB device via a multicast PW. For example, after receiving a unicast user packet with an unknown destination C-MAC, node 4 may perform Mac-in-Mac encapsulation on the user packet according to blocks S111-S113, and send the encapsulated packet to node 1 via a multicast PW of B-VLAN 20. After receiving the packet, node 1 may search in a unicast PW table for a PW having a receiving flag corresponding to a B-SMAC, a B-VLAN, an I-SID in the packet (e.g., a unicast PW table entry of PW1 in which a PW Group ID is 1 may be found), decapsulate the packet, and associate the learned source C-MAC with a corresponding PW Group ID (e.g., PW Group 1) if the C-SA (i.e., the source C-MAC) address is an unknown C-MAC.

If node 1 is going to send a packet of I-SID 100, node 1 may search in a C-MAC address table corresponding to I-SID 100 for a MAC table entry in which a C-DA (i.e., destination C-MAC) is the C-MAC address of node 4, obtain a PW Group ID in the MAC table entry, search in a unicast PW table entry corresponding to I-SID 100 for a main PW table entry that includes the PW Group ID, perform Mac-in-Mac encapsulation on the packet by using information in the PW table entry, and send the encapsulated packet to node 4.

The C-MAC address table corresponding to a service instance in node 1 may be as shown in Table 14.

TABLE 14

| VS I INDEX | C-DMAC | C-VLAN | egress port |
|---|---|---|---|
| 1 | 1-1-1 | 100 | PW Group 1 |
| 1 | 2-2-2 | 100 | if-6 |

In a BEB device, each service instance may correspond to a C-MAC address table.

III. Check of a Main Path, and Path Switchover after a Path Failure

CCM (Continuity Check Message) bi-directional check may be applied to each service instance in a BEB device. Check information is issued to a CFM (Connectivity Fault Management) module which has CFM capabilities in the BEB device by an IS-IS module which has IS-IS capabilities in the BEB device, and may include a B-SA, a B-DA, a B-VLAN, an I-SID, and so on. The CFM module encapsulates a CCM packet by using the check information. BEB devices at both ends of a path may send CCM packets at pre-defined intervals. If a BEB device at one end does not receive the CCM packet sent from the other end (e.g., the link between node 2 and node 3 is broken), a link failure is considered to have occurred. The CFM module may inform the IS-IS module of the link failure, and the IS-IS module may perform a switchover of forwarding paths.

Figure 14:
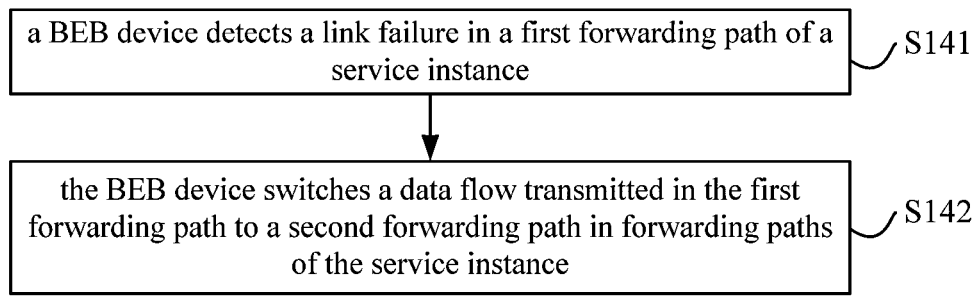
FIG. 14 is a flowchart illustrating a packet forwarding process implemented by a BEB device if a link is broken according to an example of the present disclosure.

From the above it can be seen that since multiple forwarding paths have been established for each service instance, if a link is broken, a BEB device may perform a packet forwarding process as shown in FIG. 14 in examples of the present disclosure, which may include the following procedures.

In block S141, the BEB device detects a link failure in a first forwarding path of a service instance.

The path monitoring may adopt a service instance-based detection mechanism. If a CFM module detects a failure in a B-VLAN of a service instance, the detection result is sent to the IS-IS module. The IS-IS module performs a switchover of forwarding paths for the B-VLAN of the service instance based on the detection result.

In block S142, the BEB device switches a data flow transmitted in a first forwarding path to a second forwarding path in the forwarding paths of the service instance.

For example, two B-VLANs may be allocated to the service instance to which the data flow belongs, one is a main B-VLAN and the other is a backup B-VLAN. If a failure in the main forwarding path, e.g., the first forwarding path, is detected, the CFM module informs the IS-IS module. The IS-IS module re-issues a PW table entry of a unicast PW to set the previous backup PW to be the current main PW and to set the previous main PW to be the current backup PW. Thus the second forwarding path corresponding to the backup PW is switched to become the main forwarding path. Therefore, subsequent packets of the service instance are transmitted in the second forwarding path. Then the IS-IS module instructs the CFM module to cancel a task of monitoring the previous main forwarding path and to start monitoring the new main forwarding path (i.e., the second forwarding path).

Figure 15:
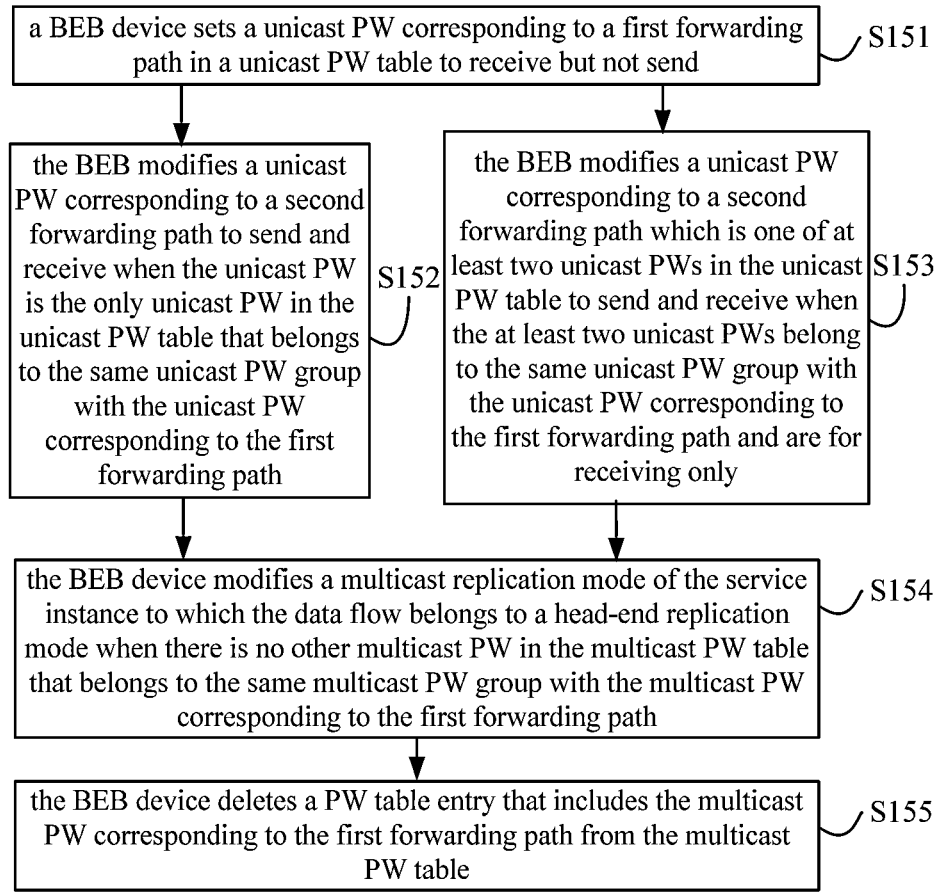
FIG. 15 is a flowchart illustrating a process of a BEB device switching a data flow transmitted in a first forwarding path to a second forwarding path according to an example of the present disclosure.

In some implementations, the process of switching the data flow transmitted in the first forwarding path to the second forwarding path in the forwarding paths of the service instance in block S142 may be as shown in FIG. 15 in examples of the present disclosure, which may include the following procedures.

In block S151, the BEB device sets a unicast PW that corresponds to the first forwarding path in a unicast PW table to receive but not send data, e.g., changing the B-VLAN corresponding to the first forwarding path into a backup B-VLAN, or changing the unicast PW corresponding to the B-VLAN corresponding to the first forwarding path into a backup unicast PW.

For example, a FLAG corresponding to the unicast PW may be modified to include an Egress flag but not an Ingress flag.

In block S152, the BEB device may modify a unicast PW corresponding to the second forwarding path to send and receive data (e.g., modifying a FLAG corresponding to the PW into "Ingress&Egress") in response to a determination that there is only one unicast PW that belongs to the same unicast PW group with the unicast PW corresponding to the first forwarding path (e.g., the unicast PW having the same PW Group ID with the unicast PW corresponding to the first forwarding path) in the unicast PW table, and the unicast PW is set to receive but not send data (which may indicate that the unicast PW is a backup unicast PW), e.g., besides the PW table entry corresponding to the first forwarding path, one PW table entry in the unicast PW table has the same PW Group ID with the first forwarding path, and the PW in the PW table entry is to receive but not send data (e.g., the FLAG in the PW table entry includes an Egress flag but not an Ingress flag).

In block S153, the BEB device may modify one of at least two unicast PWs corresponding to the second forwarding path (selecting one from the at least two) to send and receive data in response to a determination that there are at least two unicast PWs that belong to the same unicast PW group with the unicast PW corresponding to the first forwarding path in the unicast PW table and the at least two unicast PWs are both to receive but not send data, e.g., the service instance has a main B-VLAN and multiple backup B-VLANs.

If there is at least one PW table entry having the same PW Group ID with the first forwarding path in the unicast PW table besides the PW table entry corresponding to the first forwarding path, and at least one PW table entry in the at least one PW table entry is to send and receive data (e.g., the FLAG in the PW table entry is Ingress & Egress), the service instance has multiple main B-VLANs and one backup B-VLAN or multiple main B-VLANs and multiple backup B-VLANs. As the service instance has another main forwarding path besides the first forwarding path, only the procedure in block S151 is to be performed for the unicast PW table.

In block S154, in response to a determination that there is no other multicast PW that belongs to the same multicast PW group with the multicast PW corresponding to the first forwarding path in a multicast PW table, e.g., the multicast PW corresponding to the first forwarding path belongs to a multicast PW group that has only one multicast PW, which indicates the service instance has only one B-VLAN or has only one main B-VLAN (one main and one backup, or one main and multiple backups), the BEB device may modify a multicast replication mode of the service instance to which the data flow belongs into head-end replication mode. This block implements fast switchover of a multicast data flow. Subsequent broadcast packets, multicast packets, and unicast packets with unknown destination C-MAC of the service instance may be encapsulated and forwarded according to the above blocks S121-S122, and the process will not be described again herein. After convergence of the network topology following the link failure, the BEB device may return the multicast replication mode of the service instance to the tandem replication mode.

In block S155, the BEB device deletes the PW table entry that includes the multicast PW corresponding to the first forwarding path in the multicast PW table, e.g., changing the B-VLAN corresponding to the first forwarding path into a backup B-VLAN.

In response to a determination that the service instance has another main B-VLAN besides the main B-VLAN corresponding to the first forwarding path (e.g., there is another multicast PW besides the multicast PW corresponding to the first forwarding path in the multicast PW group), the BEB device may skip the procedure in block S154 because there is another available multicast PW after the PW table entry of the multicast PW corresponding to the first forwarding path is deleted.

Through the above blocks S151-S155, the BEB device may perform packet encapsulation and forwarding based on a unicast PW table and a multicast PW table in the BEB device, thereby implementing fast switchover to another main forwarding path or to a backup forwarding path after a failure occurs in one main forwarding path.

As shown in FIG. 6, if the network is running properly, a data flow between node 1 and node 4 follows path 1-2-3-4; if a link failure occurs in the path (e.g., the link between node 2 and node 3 is broken), the data flow can be quickly switched over to path 1-6-5-4.

Check of a path may include check of a point-to-point path and check of a point-to-multi-point path. Regarding a point-to-multi-point path, if it is detected that a path to a node is disconnected, the CFM module may instruct the IS-IS module to perform path switchover. In this situation, there may be two methods for the switchover. One method is to switch unicast paths and multicast paths to all of the nodes to backup paths. The other method is to switch the unicast path to the disconnected node, with the multicast path to the disconnected node and the unicast paths and multicast paths to the other nodes remaining unchanged. The second method has little impact on the network, but the multicast path to the disconnected node remains disconnected.

A link failure may affect a main path and other backup paths. The CFM module may monitor all paths and informs the IS-IS module of monitoring results of all the paths, and let the IS-IS module to select an optimal path based on the monitoring results.

The path switchover is performed in a BEB device, and a BCB device maintains forwarding table entries for all of the paths.

IV. Path Switchover Process after Convergence of Network Topology after a Link Failure After a failure in a forwarding path is detected, the data flow may be switched to another path of the service instance that the data flow belongs to. Since the network topology has changed, after convergence of the network topology, all nodes in the network may perform the procedures in blocks S22-S26 to distribute LSP information, calculate SPTs, generate and issue PW table entries and FDB table entries. After the procedures are completed, the data flow is switched to a new main path based on the situations.

Figure 16:
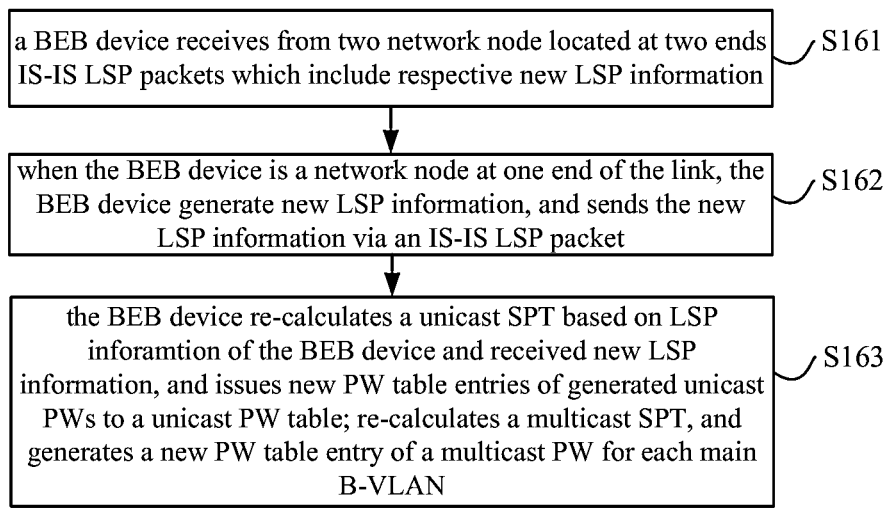
FIG. 16 is a flowchart illustrating a process of a BEB device updating a PW table entry if a link is broken according to an example of the present disclosure.

A BEB device may perform the following procedures as shown in FIG. 16 in examples of the present disclosure after a link failure in a first forwarding path is detected and the network topology has converged.

In block S161, the BEB device receives IS-IS LSP packets from network nodes at two ends of the link. The IS-IS LSP packets include new LSP information generated by the two network nodes. The network nodes may be BEB devices or BCB devices.

The network node at the each end of the link may generate new LSP information and send the new LSP information in an IS-IS packet that is then flooded throughout the whole backbone network via neighboring nodes of the network node. The generating and sending process may be similar to that in procedure S22, and will not be described further herein.

In block S162, if the BEB device is one of the two end nodes of the link, the BEB device generates new LSP information and sends the information in an IS-IS LSP packet.

In block S163, for each B-VLAN of the service instance to which the data flow transmitted in the first forwarding path belongs or for each B-VLAN of each service instance, the BEB device calculates a unicast SPT by using LSP information of the BEB device and received new LSP information and taking the BEB device as the root node to determine an egress port to each remote BEB device. The BEB device issues a new PW table entry of a unicast PW to the unicast PW table. The BEB device calculates a multicast SPT for each main B-VLAN of the service instance, and generates a new PW table entry for a multicast PW corresponding to the main B-VLAN.

Details of the process may be found in the above procedures in blocks S23-S26, and will not be described further herein.

After new PW table entries (including new PW table entries of unicast PWs and new PW table entries of multicast PWs) are generated, the BEB device may perform one of the following procedures.

Procedure 1: The BEB device updates the unicast PW table by using the new PW table entry of the unicast PW corresponding to each B-VLAN of the service instance, and updates the multicast PW table by using the new PW table entry of the multicast PW corresponding to each main B-VLAN of the service instance, and returns the mode of the service instance to tandem replication. That is, PW table entries corresponding to the service instance in the unicast PW table are all replaced with the newly generated PW table entries of the unicast PWs, and PW table entries corresponding to the service instance in the multicast PW table are all replaced with the newly generated PW table entries of the multicast PWs. As such, the data flow of the service instance is switched to a new main forwarding path.

Procedure 2: In response to a determination that one of new PW table entries of unicast PWs corresponding to a B-VLAN of the service instance is identical to the unicast PW entry corresponding to the second forwarding path, the BEB device issues the new PW table entries except the one identical to the unicast PW entry corresponding to the second forwarding path to the unicast PW table, and sets unicast PWs in the new PW table entries sent to the unicast PW table to receive but not send data. The BEB device updates the multicast PW table by using the newly generated PW table entries of the multicast PW corresponding to each main B-VLAN of the service instance, and returns the multicast replication mode of the service instance to be the tandem replication mode. To avoid frequent switchover of paths in the network, if the new SPT does not change the current main PW entries, the newly generated PWs may be issued to the PW table on the data plane as backup PWs, and the data flow is transmitted still in the previous path (i.e., the second forwarding path).

Procedure 3: In response to a determination that one of the new PW table entries of unicast PWs corresponding to each B-VLAN of the service instance is the same as the unicast PW table entry corresponding to the second forwarding path, the BEB device updates the unicast PW table by using the new PW table entries of the unicast PWs of the service instance after a time period. The BEB device updates the multicast PW table by using the newly generated PW table entries of the multicast PW corresponding to each main B-VLAN of the service instance, and returns the multicast replication mode of the service instance to be the tandem replication mode. To avoid frequent switchover of paths in the network, if the new SPT does not change the current main PW entries, the data flow may be switched to a new path after a pre-defined time period.

In response to a determination that a link in the first forwarding path is broken, the BEB device modifies the mode of the service instance to which the data flow transmitted in the first forwarding path belongs into the head-end replication mode. After the network topology has converged and the BEB device has issued the new PW table entries of the multicast PW to the multicast PW table, the BEB device may return the multicast replication mode to be the tandem replication mode.

Figure 17:
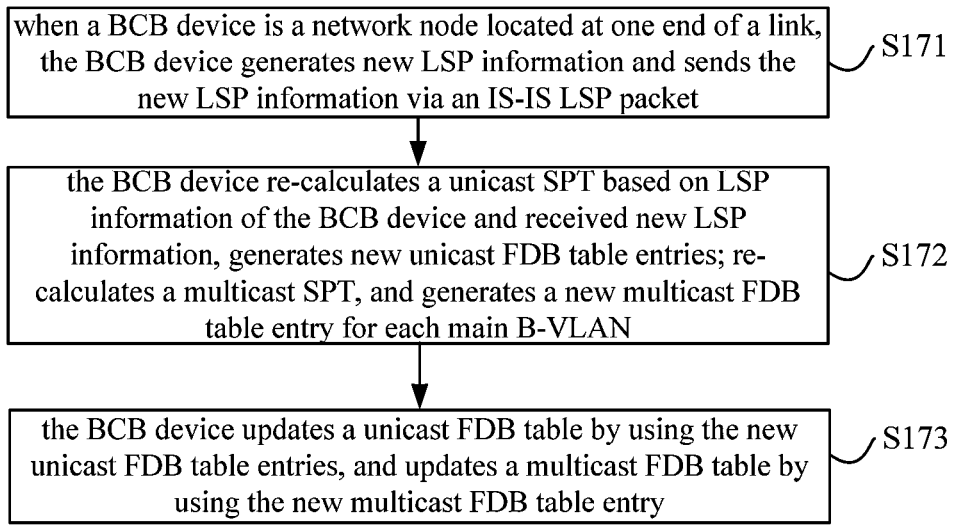
FIG. 17 is a flowchart illustrating a process of a BCB device updating an FDB table entry according to an example of the present disclosure.

After the convergence of network topology in case of a link failure in the first forwarding path, each BCB device may perform the procedures as shown in FIG. 17 in examples of the present disclosure.

The BCB device receives IS-IS LSP packets from network nodes at the two ends of the link. The IS-IS LSP packets include new LSP information generated by the two network nodes. The network nodes may be BEB devices or BCB devices.

In block S171, in response to a determination that the BCB device is one of end nodes of the link, the BCB device generates new LSP information and sends the information in an IS-IS LSP packet.

In block S172, the BCB device calculates a unicast SPT for each B-VLAN by using the LSP information of the BCB device and new LSP information received, and generates new unicast FDB table entries of the B-VLAN. The BCB device also calculates a multicast SPT for each main B-VLAN, and generates a new multicast FDB table entry corresponding to the main B-VLAN.

In block S173, the BCB device updates the unicast FDB table by using the new unicast FDB table entries, and updates the multicast FDB table by using the new multicast FDB table entries.

Still taking the network structure as shown in FIG. 6 as an example, if the link between node 2 and node 3 is broken, node 2 and node 3 may notify the new LSP information to all of the nodes. All of the nodes may re-calculate a SPT and generate new FDB table entries and new PW table entries. BEB devices may update main PWs and backup PWs based on the calculation results to switch network traffic to the new main paths, e.g., the path 1-2-5-4 shown in FIG. 6.

V. Path Switchover after Link Failure Recovers

Figure 18:
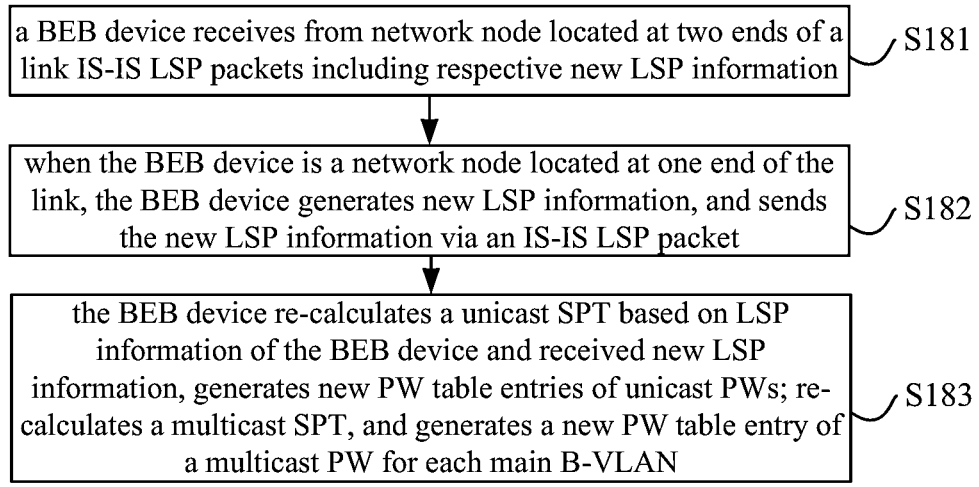
FIG. 18 is a flowchart illustrating a process of a BEB device updating a PW table entry after a link failure is recovered according to an example of the present disclosure.

After the link failure is recovered, a BEB device may perform the procedures as shown in FIG. 18 in examples of the present disclosure.

In block S181, the BEB device receives IS-IS LSP packets carrying new LSP information generated by two network nodes at the two ends of the link. The network nodes may be BEB devices or BCB devices.

The network node at each end of the link may generate new LSP information and send the new LSP information in an IS-IS packet which is then flooded throughout the whole backbone network via neighboring nodes of the network node. The generating and sending process may be similar to that in procedure S22, and will not be described further herein.

In block S182, if the BEB device is one of the two end nodes of the link, the BEB device generates new LSP information and sends the information in an IS-IS LSP packet.

In block S183, the BEB device calculates a unicast SPT for each B-VLAN of the service instance to which the data flow transmitted in the first forwarding path belongs by using LSP information of the BEB device and received new LSP information, and generates new PW table entries of unicast PWs corresponding to the B-VLAN. The BEB device also calculates a multicast SPT for each main B-VLAN, and generates a new multicast FDB table entry corresponding to the main B-VLAN.

Details of the process may be found in the above procedures in blocks S23-S26.

After new PW table entries (including new PW table entries of unicast PWs and the new PW table entries of the multicast PWs) are generated, the BEB device may perform one of the following procedures.

Procedure 1: The BEB device updates the unicast PW table by using the new PW table entries corresponding to each B-VLAN of the service instance, and updates the multicast PW table by using the new PW table entry of the multicast PW corresponding to each main B-VLAN. The process may include replacing all of PW table entries corresponding to the service instance in the unicast PW table with the new PW table entries of the unicast PWs, and replacing all of PW table entries corresponding to the service instance in the multicast PW table with the new PW table entries of the multicast PWs. As such, the data flow of the service instance is switched to a new main forwarding path.

Procedure 2: In response to a determination that one of new PW table entries of unicast PWs corresponding to a B-VLAN of the service instance is identical to the unicast PW entry corresponding to the current forwarding path, the BEB device issues the new PW table entries except the one identical to the unicast PW entry corresponding to the current forwarding path to the unicast PW table, and sets unicast PWs in the new PW table entries sent to the unicast PW table to receive but not send data. To avoid frequent switchover of network paths, if the new SPT does not change the current main PW entries, the newly generated PWs may be issued to the PW table on the data plane as backup PWs, and the data flows are still transmitted in previous paths.

Procedure 3: In response to a determination that one of the new PW table entries of the unicast PWs is identical to the unicast PW table entry corresponding to the current forwarding path, the BEB device delays a pre-defined time period and then updates the unicast PW table with the new PW table entry of the service instance. To avoid frequent path switchover in the network, if the new SPT does not change the current main PW entries, the data flow may be switched to a new path after a pre-defined time period.

Procedure 4: In response to a determination that one of the new PW table entries of the multicast PWs is identical to the multicast PW table entry corresponding to the current forwarding path, the BEB device does not issue the new PW table entry of the multicast PW to the multicast PW table, or updates the multicast PW table by using the new PW table entry of the multicast PW of the service instance after a pre-defined time period. To avoid frequent path switchover in the network, if the new SPT does not change the current main PW entries, the data flow may be transmitted in previous paths or be switched to new paths after a pre-defined time period.

Figure 19:
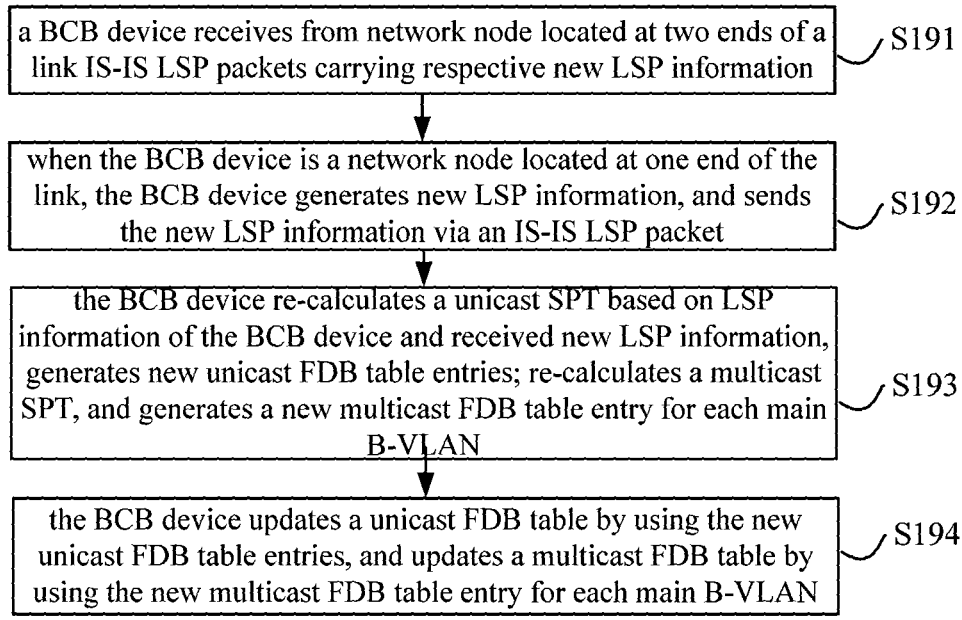
FIG. 19 is a flowchart illustrating a process of a BCB device updating an FDB table entry after a link failure is recovered according to an example of the present disclosure.

After the link failure is recovered, each BCB device may perform the procedures as shown in FIG. 19 in examples of the present disclosure.

In block S191, the BCB device receives IS-IS LSP packets from network nodes at the two ends of the link. The IS-IS LSP packets include new LSP information generated by the two network nodes. The network nodes may be BEB devices or BCB devices.

In block S192, in response to a determination that the BCB device is one of the two end nodes of the link, the BCB device generates new LSP information and sends the information in an IS-IS LSP packet.

In block S193, the BCB device calculates a unicast SPT for each B-VLAN of the service instance to which the data flow transmitted in the first forwarding path belongs by using LSP information of the BCB device and received new LSP information, and generates new FDB table entries corresponding to the B-VLAN. The BCB device also calculates a multicast SPT for each main B-VLAN, and generates a new multicast FDB table entry corresponding to the main B-VLAN.

In block S194, the BCB device updates the unicast FDB table by using the new unicast FDB table entries, and updates the multicast FDB table by using the new multicast FDB table entries.

As shown in FIG. 6, if the link failure between node 2 and node 3 is recovered, node 2 and node 3 may send a new LSP information notification to all the nodes. All the nodes re-calculate the SPT and generate new FDB table entries and PW table entries. The BEB devices may update the main PWs and backup PWs based on the calculation results to switch network traffic to the new main PWs, such as the path 1-2-3-4 as shown in FIG. 6.

To avoid frequent switchover of network paths, if the new SPT does not change the current main PW entries, the newly generated PWs may be issued to the PW table on the data plane as backup PWs, and the data flows are still transmitted in previous paths. Alternatively, the data flows may be switched to the new paths after a certain time period.

Corresponding to the methods of the above examples, a BEB device and a BCB device for executing the above processes are also provided by examples.

Figure 20:
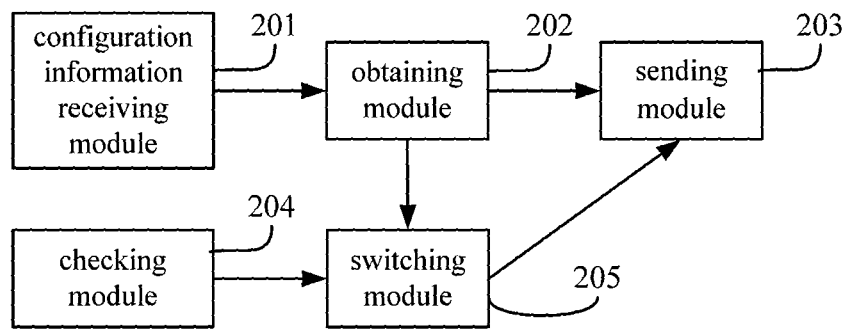
FIG. 20 is a schematic diagram illustrating a structure of a BEB device according to an example of the present disclosure.

As shown in FIG. 20, a BEB device according to examples of the present disclosure may include a configuration information receiving module 201, an obtaining module 202, a sending module 203, a checking module 204 and a switching module 205. The modules described in various examples may be implemented mechanically or electronically. For example, a module may comprise dedicated circuitry or logic that is permanently configured (e.g., as a special-purpose processor, such as a field programmable gate array (FPGA) or an ASIC) to perform certain operations. A module may also comprise programmable logic or circuitry (e.g., as encompassed within a general-purpose processor or other programmable processor) that is temporarily configured by software to perform certain operations.

The configuration information receiving module 201 may receive configuration information for a service instance configured in the BEB device. The configuration information may include at least two B-VLANs allocated to the service instance and an ECT algorithm mapped to each B-VLAN. Each B-VLAN is mapped to an ECT algorithm, and different B-VLANs are mapped to different ECT algorithms. The configuration information may be received from a human-machine interface and may be configured by an administrator. The configuration information may also be obtained or received from another device, e.g., a server, via a network. The configuration information may also be obtained by accessing a configuration file in a local storage device or a removable storage device or stored in a device via a network.

The obtaining module 202 may calculate a forwarding path between the BEB device and each remote BEB device that is configured with the same service instance for each B-VLAN of the service instance by using an ECT algorithm mapped to the B-VLAN and based on LSP information of the whole backbone network, thereby obtaining different forwarding paths for different B-VLANs of the service instance.

The sending module 203 may transport a data flow in a first forwarding path of a service instance.

The checking module 204 may check whether or not a link in a forwarding path of the service instance is broken.

The switching module 205 may switch a data flow transmitted in a first forwarding path to a second forwarding path in forwarding paths of the service instance if the checking module detects a link in the first forwarding path is broken.

Figure 21:
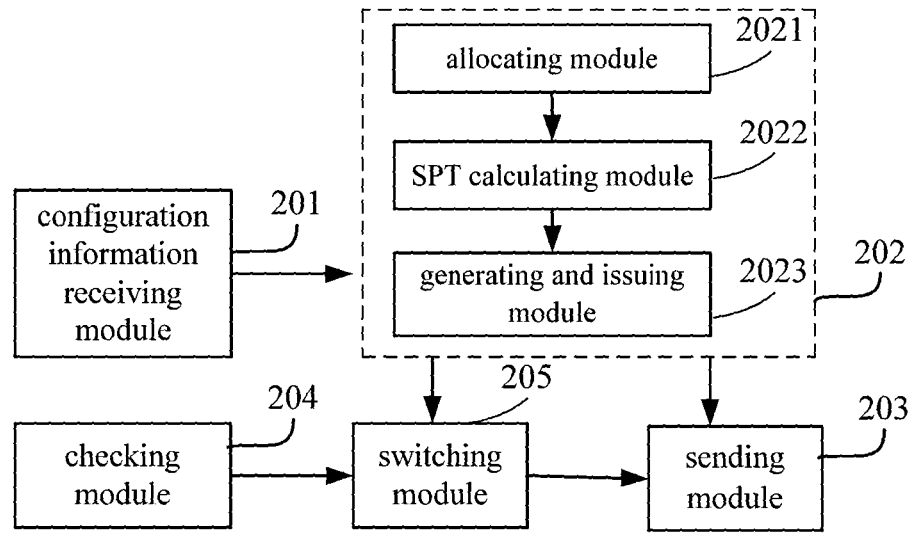
FIG. 21 is a schematic diagram illustrating a structure of a BEB device according to an example of the present disclosure.

In an example as shown in FIG. 21, the obtaining module 202 may include an allocating module 2021, an SPT calculating module 2022, and a generating and issuing module 2023. The allocating module 2021 may allocate a unicast PW group for the remote BEB device. The SPT calculating module 2022 may calculate a unicast SPT for each B-VLAN of the service instance by using an ECT algorithm mapped to the B-VLAN and by taking the BEB device as the root node by using LSP information of the BEB device and received LSP information. The generating and issuing module 2023 may generate a unicast PW for each B-VLAN of the service instance, issue a PW table entry of the unicast PW to a unicast PW table, and set a sending and receiving attribute of the unicast PW. In some examples, all unicast PWs generated for the remote BEB device belong to the unicast PW group allocated to the remote BEB device. A PW table entry of each unicast PW may include a unicast PW group ID, a PW ID, a B-VLAN, and an egress port. If the B-VLANs of the service instance include a main B-VLAN and a backup B-VLAN, the generating and issuing module 2023 may also set the backup unicast PW to receive but not send data if issuing the PW table entry generated for the backup unicast PW corresponding to the backup B-VLAN to the unicast PW table. If a B-VLAN of the service instance is a main B-VLAN, the generating and issuing module 2023 may also set the main unicast PW to send and receive packets if issuing a PW table entry generated for the main unicast PW corresponding to the main B-VLAN to the unicast PW table.

Figure 22:
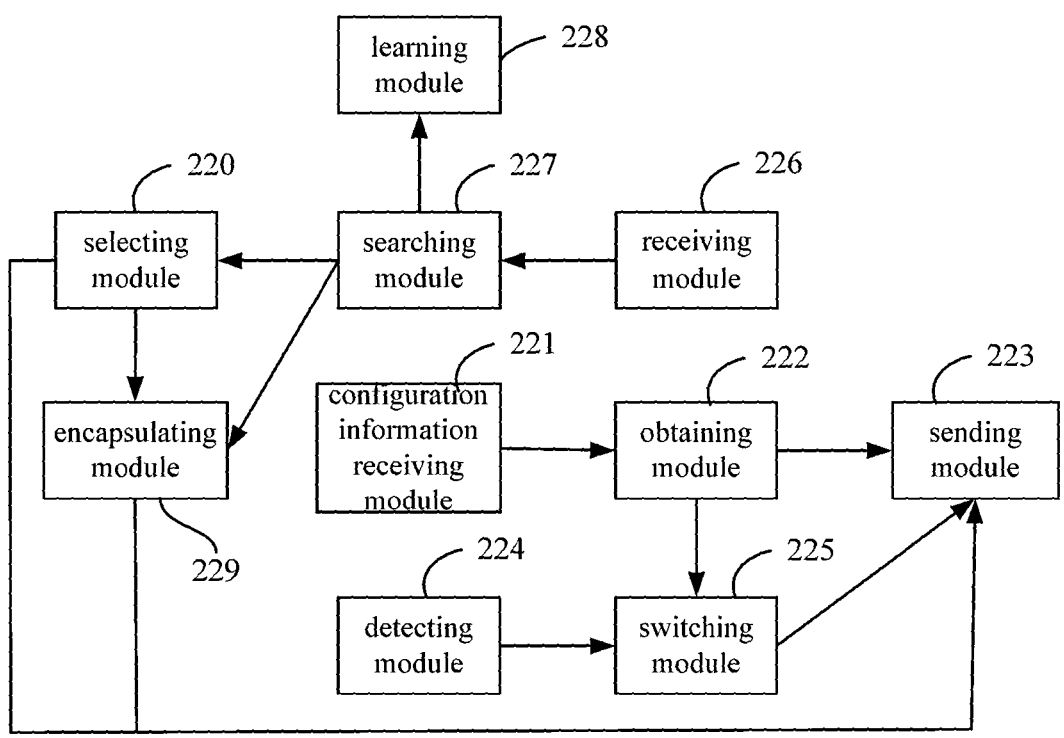
FIG. 22 is a schematic diagram illustrating a structure of a BEB device according to an example of the present disclosure.

As shown in FIG. 22, a BEB device may include a configuration information receiving module 221, an obtaining module 222, a sending module 223, a checking module 224, and a switching module 225, which have the same or similar functions with corresponding modules as shown in FIG. 20 The BEB device may also include a receiving module 226, a searching module 227, a learning module 228, an encapsulating module 229, and a selecting module 220.

The receiving module 226 may receive a user packet from a user network, and receives a Mac-in-Mac packet from a backbone network.

The searching module 227 may look up a unicast PW table for a unicast PW corresponding to an I-SID, a B-VLAN, and a B-SMAC in the Mac-in-Mac packet after the receiving module receives the Mac-in-Mac packet. The searching module 227 also searches for a service instance corresponding to an ingress port via which the user packet is received after the receiving module 226 receives the user packet from the user network, and searches in a C-MAC address table corresponding to the service instance for an egress port corresponding to a C-MAC address that is consistent with a destination C-MAC address in the user packet. The searching module 227 also searches a unicast PW table for a unicast PW corresponding to an I-SID, a B-VLAN, and a B-SMAC in the Mac-in-Mac packet received by the receiving module 226.

The learning module 228 may store the source C-MAC address learned from the Mac-in-Mac packet into a C-MAC address table of a service instance identified by the I-SID in response to a determination that the source C-MAC address is an unknown C-MAC address, and sets an egress port corresponding to the source C-MAC address to be a unicast PW group to which the unicast PW found by the searching module 227 belongs.

The encapsulating module 229 may perform Mac-in-Mac encapsulation on the user packet by using an I-SID, a B-SMAC, a B-DMAC, and a B-VLAN corresponding to a PW in the unicast PW table in response to a determination that the egress port found by the searching module 227 is a unicast PW group and only one PW in the unicast PW group is to send and receive packets, and performs Mac-in-Mac encapsulation on the user packet by using an I-SID, a B-SMAC, a B-DMAC, and a B-VLAN in the unicast PW table corresponding to a PW selected by the selecting module 220.

The selecting module 220 may select a PW from at least two PWs based on a pre-defined load-balancing rule in response to a determination that the egress port found by the searching module 227 is a unicast PW group and at least two PWs in the unicast PW group is to send and receive packets.

The sending module 223 may send a Mac-in-Mac packet obtained by the encapsulating module 229 via an egress port corresponding to a PW in response to a determination that the egress port found by the searching module 226 is a PW group and the PW is one PW in the PW group that is to send and receive packets. The sending module 223 may send a Mac-in-Mac packet obtained by the encapsulating module 227229 via an egress port corresponding to a PW selected by the selecting module 220 in response to a determination that the egress port found by the searching module 227 is a unicast PW group and at least two PWs in the PW group are for sending and receiving.

For fast switchover of a unicast data flow, the switching module may include a configuration modifying module. The configuration modifying module may set a unicast PW corresponding to a first forwarding path in a unicast PW table to receive but not send packets. The configuration modifying module may modify a unicast PW to send and receive packets in response to a determination that the unicast PW is the only PW in the unicast PW table that belongs to the same unicast PW group with the unicast PW corresponding to the first forwarding path and the unicast PW is to receive but not send packets, e.g., the unicast PW is corresponding to a second forwarding path. The configuration modifying module modifies a unicast PW corresponding to the second forwarding path of at least two unicast PWs to send and receive packets in response to a determination that the at least two unicast PWs in the unicast PW table belong to the same unicast PW group with the unicast PW corresponding to the first forwarding path and the at least two unicast PWs are to receive but not send packets.

If the multicast replication mode of the service instance is tandem replication, in order to implement generating and issuing of a multicast PW entry, in the obtaining module 222, the allocating module may allocate a multicast PW group for the service instance, the SPT calculating module may calculate a multicast SPT for each main B-VLAN of the service instance by taking a remote BEB device as a root node and using an ECT algorithm mapped to the main B-VLAN based on LSP information of the BEB device and received LSP information to determine at least one egress port to the remote BEB device, the generating and issuing module generates a multicast PW for each main B-VLAN of the service instance, issues a PW table entry of the multicast PW generated for the main B-VLAN to a multicast PW table, and sets the multicast PW to send but not receive packets. The multicast PW corresponding to each main B-VLAN belongs to the multicast PW group allocated to the service instance. The PW table entry of each multicast PW includes a multicast PW group ID, a PW ID, a B-VLAN, and an egress port.

For forwarding broadcast packets, multicast packets, and unicast packets with unknown destination C-MAC addresses under the tandem replication mode, the receiving module 226 may receive a user packet from a user network, where the user packet is one of a broadcast packet, a multicast packet, and a unicast packet with an unknown destination C-MAC address. In response to a determination that the service instance corresponding to the user packet adopts the tandem replication mode, the encapsulating module 229 may perform Mac-in-Mac encapsulation on the user packet by using an I-SID, a B-SMAC, a B-DMAC, and a B-VLAN corresponding to a multicast PW in the multicast PW table in response to a determination that the multicast PW is the only multicast PW that is to send packets in the multicast PW group corresponding to the service instance, and may perform Mac-in-Mac encapsulation on the user packet by using an I-SID, a B-SMAC, a B-DMAC, and a B-VLAN corresponding to a multicast PW selected by the selecting module 220 from the multicast PW table in response to a determination that at least two multicast PW in the multicast PW group corresponding to the service instance are for sending. In response to a determination that the service instance corresponding to the user packet adopts the tandem replication mode, the sending module 223 may send a Mac-in-Mac packet obtained by the encapsulating module 229 via an egress port corresponding to a multicast PW in response to a determination that the multicast PW is the only multicast PW in the multicast PW group corresponding to the service instance that is to send packets, and may send the Mac-in-Mac packet obtained by the encapsulating module 229 via an egress port corresponding to a multicast PW selected by the selecting module 220 in response to a determination that at least two multicast PWs in the multicast PW group corresponding to the service instance are to send packets. In response to a determination that the service instance corresponding to the user packet adopts the tandem replication mode, the selecting module 220 may select a multicast PW from at least two multicast PWs based on a pre-defined load-balancing rule in response to a determination that the at least two multicast PWs are to send packets in the multicast PW group corresponding to the service instance.

For forwarding broadcast packets, multicast packets, and unicast packets with unknown destination C-MAC addresses under the head-end replication mode, in response to a determination that the service instance corresponding to the user packet adopts the head-end replication mode, the encapsulating module 229 may generate a copy of the user packet for each unicast PW group of the service instance, performs Mac-in-Mac encapsulation on the copy of the user packet by using an I-SID, a B-SMAC, a B-DMAC, and a B-VLAN corresponding to a unicast PW to send and receive packets in the unicast PW group in the unicast PW table. In response to a determination that at least two unicast PWs in the unicast PW group corresponding to the service instance are to send and receive packets, the encapsulating module 229 may instruct the selecting module 220 to select a unicast PW from the at least two unicast PWs based on a pre-defined load-balancing rule. The sending module 223 may send a Mac-in-Mac packet obtained by the encapsulating module 229 via an egress port corresponding to the unicast PW.

Figure 23:
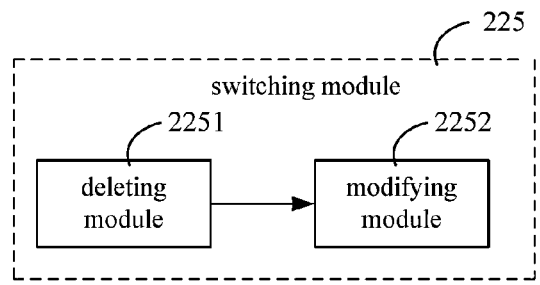
FIG. 23 is a schematic diagram illustrating a switching module of a BEB device according to an example of the present disclosure.

For fast switchover of a broadcast data flow, a multicast data flow, and a unicast data flow with an unknown destination C-MAC, the switching module 225 may include a deleting module 2251 and a modifying module 2252, as in an example shown in FIG. 23. The deleting module may delete a PW table entry that includes a multicast PW corresponding to the first forwarding path in the multicast PW table. The modifying module may modify a multicast replication mode into head-end replication mode before the deleting module performs the deletion in response to a determination that there is no other multicast PW in the multicast PW table that belongs to the same multicast PW group with the multicast PW corresponding to the first forwarding path. After convergence of the network topology following the link failure, the modifying module may recover the multicast replication mode of the service instance to be the tandem replication mode.

The generating and issuing module of the obtaining module 222 may also perform one of the following procedures after convergence of the network topology following a link failure in the first forwarding path or after convergence of the network topology following the recovery of the link failure:

(1) updating the unicast PW table by using the new PW table entries corresponding to each B-VLAN of the service instance, and updating the multicast PW table by using the new PW table entry of the multicast PW corresponding to each main B-VLAN;

(2) if one of new PW table entries of unicast PWs corresponding to a B-VLAN of the service instance is identical to the unicast PW entry corresponding to the second forwarding path, sending the new PW table entries except the one identical to the unicast PW entry corresponding to the second forwarding path to the unicast PW table, and sets unicast PWs in the new PW table entries sent to the unicast PW table to receive but not send packets; updating the multicast PW table by using a new PW table entry of a multicast PW generated for each main B-VLAN of the service instance;

(3) if one of new PW table entries of unicast PWs corresponding to a B-VLAN of the service instance is identical to the unicast PW entry corresponding to the second forwarding path, updating the unicast PW table by using the new PW table entries of the unicast PWs of the service instance after a time period; and updating the multicast PW table by using a new PW table entry of a multicast PW generated for each main B-VLAN of the service instance.

After the multicast PW table is updated using the new PW table entry of the multicast PW corresponding to each main B-VLAN of the service instance, the multicast replication mode of the service instance is may be returned to the tandem replication mode.

Figure 24:
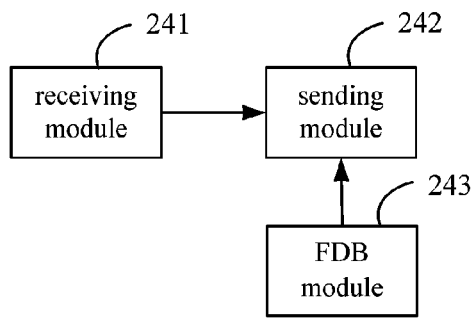
FIG. 24 is a schematic diagram illustrating a structure of a BCB device according to an example of the present disclosure.

Corresponding to the methods of the above examples, a BCB device which is capable of executing the above methods for a BCB device is also provided. In the BCB device, each B-VLAN is mapped to an ECT algorithm, and different B-VLANs are mapped to different ECT algorithms. As shown in FIG. 24 in examples of the present disclosure, the BCB device may include a receiving module 241, a sending module 242, and an FDB module 243.

The receiving module 241 receives a Mac-in-Mac packet.

The sending module 242 forwards the Mac-in-Mac packet received by the receiving module 241 according to an FDB table.

The FDB module 243 calculates a multicast SPT for each main B-VLAN of a service instance by using an ECT algorithm mapped to the main B-VLAN and by taking each BEB device that is configured with the service instance as a root node based on LSP information of the BCB information and received LSP information in response to a determination that B-VLANs of the service instance include a main B-VLAN and a backup B-VLAN.

The FDB module 243 also generates an FDB table entry corresponding to each main B-VLAN based on the multicast SPT calculated for the main B-VLAN, and issues the FDB table entry to a multicast FDB table.

The modules or modules of the BEB device or the BCB device may be integrated into one entity or be deployed in a distributed manner. The modules or modules of the BEB device or the BCB device may be combined into one module or module, or be divided further into multiple sub modules or sub modules.

Figure 25:
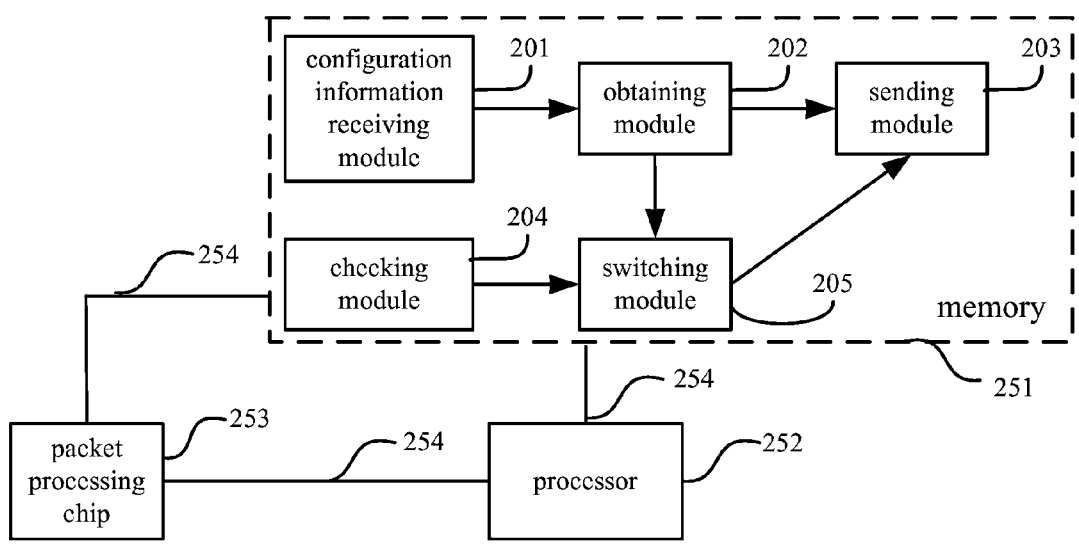
FIG. 25 is a schematic diagram illustrating a structure of a BEB device according to an example of the present disclosure.

The above is a description of the BEB device. The following illustrates a hardware structure of the BEB device. The BEB device may be a programmable device implemented by software and hardware, as shown in FIG. 25. FIG. 25 is a schematic diagram illustrating a hardware structure of a BEB device in examples of the present disclosure. The BEB device may include a memory 251, a processor 252, a packet processing chip 253, and an interconnecting component 254 which connects the memory 251, the processor 252, and the packet processing chip 253.

The memory 251 stores instruction codes and various tables, e.g., the FDB table, the unicast PW table, the multicast PW table, the MAC address table and the like. The instruction codes are executed by the processor 252 to implement the functions of the configuration information receiving module, the obtaining module, the checking module, the switching module, the receiving module, the searching module, the encapsulating module, the selecting module, the sending module, the sending module and the studying module and etc. in the BEB device as described above in reference to FIGS. 202 and 223, thus they will not be described further herein.

The processor 252 communicates with the packet processing chip 253 to send and receive data packets including a user packet and a Mac-in-Mac packet, communicates with the memory 251 to read and execute the instruction codes stored in the memory 251 to implement the functions of the configuration information receiving module, the obtaining module, the checking module, the switching module, the receiving module, the searching module, the encapsulating module, the selecting module, the sending module and the studying module and etc. in the BEB device, and processes packets received from the packet processing chip 253.

The packet processing chip 253 connects with BCB devices in a backbone network and devices in a user network via interfaces provided by the chip. The packet processing chip 252 is responsible to send and receive data packets and protocol packets. The packet processing chip 252 sends a Mac-in-Mac packet from the processor 252 to a BCB device, sends a user packet from the processor 252 to the user network, and sends received protocol packets and data packets to the processor 252.

The interconnecting component 254 provides communication tunnels between the modules, which may be a bus connected with each of the modules or multiple wired or wireless connections between the multiple modules.

The BEB device shown in FIG. 25 is merely an example. The BEB device may be implemented by a different structure, e.g., the operations implemented by executing the instruction codes may be implemented by an ASIC (Application Specific Integrated Circuit). The processor 252 may be one or multiple processors. If there are multiple processors, the multiple processors work together to read and execute the instruction codes. The structure of the BEB device is not limited in the present disclosure.

The BCB device may adopt a similar hardware structure with that shown in FIG. 2525, and will not be described further herein.

The above technical schemes may be applied to P2P networks, P2MP networks, and MP2MP (Multi-Point-to-Multi-Point) networks, and is applicable to the tandem replication mode and the head-end replication mode.

According to examples of the present disclosure, multiple B-VLANs are allocated to a service instance, and each B-VLAN corresponds to a forwarding path of the service instance. Forwarding paths corresponding to the multiple B-VLANs have the same source BEB device and the same destination BEB device but traverse different paths. Multiple forwarding paths are thus established for the service instance, and if one of the forwarding paths is disconnected, the data flow of the service instance is switched quickly to another forwarding path of the service instance, which reduces the time needed to recover the data flow and hastens the switchover of the data flow in case of a link failure.

Examples of the present disclosure may utilize Ethernet OAM (Operation, Administration, and Management) for monitoring the paths. Currently most devices are equipped with dedicated CPU for processing Ethernet OAM, and the dedicated CPU is capable of providing performances at the level of 10 ms. The paths may be monitored based on service instances (I-SID). The forwarding paths corresponding to main B-VLANs of a service instance may be monitored, or forwarding paths corresponding to all B-VLANs of a service instance may be monitored.

According to examples of the present disclosure, multiple forwarding paths are established for a service instance, and load balancing is applied among the multiple forwarding paths to improve the load balancing performances of the network and to make workload of the forwarding paths more balanced.

According to examples of the present disclosure, after convergence of network topology following a network failure or following recovery of a failure, a new forwarding path is used as a backup path, or the switch may be performed after a time delay to avoid frequent switchover of data flows in the network.

It should be understood that in the above processes and structures, not all of the procedures and modules are necessary. Certain procedures or modules may be omitted according to the needs. The order of the procedures is not fixed, and can be adjusted according to the needs. The modules are defined based on function simply for facilitating description. In implementation, a module may be implemented by multiple modules, and functions of multiple modules may be implemented by the same module. The modules may reside in the same device or distribute in different devices. The "first", "second" in the above descriptions are merely for distinguishing two similar objects, and have no substantial meanings.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which is to store instructions to cause a machine to execute a method as described herein. Specifically, a system or apparatus having a storage medium which stores machine-readable program codes for implementing functions of any of the above examples and which may make the system or the apparatus (or CPU or MPU) read and execute the program codes stored in the storage medium. In addition, instructions of the program codes may cause an operating system running in a computer to implement part or all of the operations. In addition, the program codes implemented from a storage medium are written in a storage device in an extension board inserted in the computer or in a storage in an extension module connected to the computer. In this example, a CPU in the extension board or the extension module executes at least part of the operations according to the instructions based on the program codes to realize the technical scheme of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The invention claimed is:

1. A method comprising:
    calculating a first forwarding path between a Backbone Edge Bridge (BEB) device and a remote BEB device for a first Backbone VLAN (B-VLAN) allocated to a service instance using a first Equal Cost Tree (ECT) algorithm and Link State PDU (LSP) information;
    calculating a second forwarding path between the BEB device and the remote BEB device for a second B-VLAN allocated to the service instance using a second ECT algorithm and the LSP information;
    detecting a link failure in the first forwarding path; and
    in response to detecting the link failure, switching a data flow from the first forwarding path to the second forwarding path,
    wherein calculating the first forwarding path and calculating the second forwarding path comprise:
    allocating a unicast Pseudo Wire (PW) group for the remote BEB device,
    generating a first unicast PW in the unicast PW group for the first B-VLAN,
    generating a second unicast PW in the unicast PW group for the second B-VLAN,
    issuing a PW table entry for each of the first and second unicast PWs to a unicast PW table,
    wherein issuing the PW table entry for each of the first and second unicast PWs to the unicast PW table, comprises:
        issuing a first unicast PW table entry for the first unicast PW to the unicast PW table, the first unicast PW table entry comprising a unicast PW group ID of the unicast PW group; and
        issuing a second unicast PW table entry of the second unicast PW to the unicast PW table, the second unicast PW table entry comprising the unicast PW group ID,
    setting a first sending and receiving attribute of the first unicast PW, and
    setting a second sending and receiving attribute of the second unicast PW.

2. The method of claim 1, further comprising:
    calculating a unicast SPT (Shortest Path Tree) for each of the B-VLANs allocated to the service instance, comprising:
        calculating a first unicast SPT to determine a first egress port to the remote BEB device for the first B-VLAN assuming the BEB device is a root node; and
        calculating a second unicast SPT to determine a second egress port to the remote BEB device for the second B-VLAN assuming the BEB device is the root node; and
    wherein the first unicast PW table entry further comprises a first unicast PW ID of the first unicast PW, a first B-VLAN ID of the first B-VLAN, and the first egress port, and the second unicast PW table entry further comprises a second PW ID of the second unicast PW, a second B-VLAN ID of the second B-VLAN, and the second egress port.

3. The method of claim 2, further comprising:
    receiving a Mac-in-Mac packet from a backbone network, the Mac-in-Mac packet comprising a Backbone Service Identifier (I-SID) of the service instance, the first B-VLAN ID of the first B-VLAN, a first Backbone Source MAC address (B-SMAC) corresponding to the remote BEB device, and a source Customer MAC address (C-MAC);

storing the source C-MAC address in a C-MAC address table entry in a C-MAC address table of the service instance;

setting a third egress port of the C-MAC address table entry in the C-MAC address table to the unicast PW group of the first unicast PW; and before detecting the link failure in the first forwarding path, transporting the data flow in the first forwarding path, comprising:

determining a user packet received from a user network at an ingress port corresponds to the service instance, the user packet comprising a destination C-MAC address;

searching the C-MAC address table of the service instance to determine that the C-MAC address table entry includes the destination C-MAC address in the user packet;

if the third egress port in the C-MAC address table entry is set to the unicast PW group and the first unicast PW is the only unicast PW in the unicast PW table that is set to send and receive packets:

performing Mac-in-Mac encapsulation on the user packet by using the I-SID, a second B-SMAC corresponding to the BEB device, a Backbone Destination MAC address (B-DMAC) that is the same as the first B-SMAC corresponding to the remote BEB device, and the first B-VLAN ID in the first unicast PW table entry of the first unicast PW in the unicast PW table; and sending the Mac-in-Mac encapsulated user packet via the first egress port of the first unicast PW; and if the third egress port in the C-MAC address table entry is set to the unicast PW group and at least two unicast PWs in the unicast PW group are to send and receive packets:

selecting the first unicast PW from the first and the second unicast PWs in the unicast PW group based on a load-balancing rule;

performing Mac-in-Mac encapsulation on the user packet by using the I-SID, the second B-SMAC, the B-DMAC, and the first B-VLAN in the first unicast PW table entry of the first PW in the unicast PW table; and sending the Mac-in-Mac encapsulated user packet via the first egress port of the first unicast PW.

4. The method of claim 3, wherein switching the data flow from the first forwarding path to the second forwarding path comprises:

setting the first unicast PW entry for the first unicast PW in the unicast PW table to receive but not send packets;

modifying any other unicast PW, which belongs to the same unicast PW group as the first unicast PW and is set to receive but not send packets, to send and receive packets.

5. The method of claim 2, wherein the first B-VLAN is a main B-VLAN of the service instance, and further comprising:

allocating a multicast PW group to the service instance;

calculating a multicast SPT for the main B-VLAN of the service instance, including calculating a first multicast SPT to determine a third egress port to the remote BEB device for the first B-VLAN by using the first ECT algorithm and the LSP information and assuming the remote BEB device is the root node;

generating a multicast PW for the main B-VLAN, including generating a first multicast PW for the first B-VLAN;

issuing a multicast PW table entry for each multicast PW generated for the main B-VLAN to a multicast PW table, including issuing a first multicast PW table entry of the first multicast PW for the first B-VLAN to the multicast PW table, wherein the first multicast PW table entry comprises a multicast PW group ID of the multicast PW group, a first multicast PW ID of the first multicast PW, the first B-VLAN ID of the first B-VLAN, and the third egress port; and setting the first multicast PW to send but not receive packets.

6. The method of claim 5, wherein transporting the data flow in the first forwarding path comprises:

receiving a user packet from a user network, the user packet being a broadcast packet, a multicast packet, or a unicast packet, the unicast packet having a destination C-MAC address that is unknown;

determining the user packet is associated to the service instance;

if a multicast replication mode of the service instance is in a tandem replication mode and the first multicast PW is an only multicast PW in the multicast PW group of the service instance set to send but not receive packets:

performing Mac-in-Mac encapsulation on the user packet using an I-SID of the service instance, a Backbone Source MAC address (B-SMAC) corresponding to the BEB device, a Backbone Destination MAC address (B-DMAC) corresponding to a multicast address, and the first B-VLAN ID in the first multicast PW table entry of the first multicast PW in the multicast PW table; and sending the Mac-in-Mac encapsulated user packet via the third egress port of the first multicast PW;

if the multicast replication mode of the service instance is in the tandem replication mode and at least two multicast PWs in the multicast PW group of the service instance are set to send but not receive packets:

selecting the first multicast PW from the at least two multicast PWs in the multicast PW group of the service instance based on a load-balancing rule;

performing Mac-in-Mac encapsulation on the user packet using the I-SID of the service instance, the B-SMAC, the B-DMAC, and the first B-VLAN in the first multicast PW table entry of the first multicast PW in the multicast table; and sending the Mac-in-Mac encapsulated user packet via the third egress port of the first multicast PW; and if the multicast replication mode of the service instance is in a head-end replication mode, for each unicast PW group of the service instance:

performing Mac-in-Mac encapsulation on a copy of the user packet by using the I-SID, the B-SMAC, and a respective B-DMAC and a respective B-VLAN ID of a particular unicast PW that is in the respective unicast PW group and is to send and receive packets; and sending the Mac-in-Mac encapsulated copy of the user packet via a respective egress port of the particular unicast PW; and if at least two unicast PWs in the unicast PW group are set to send and receive packets, selecting the particular unicast PW from the at least two unicast PWs based on a second load-balancing rule.

7. The method of claim 6, wherein switching the data flow from the first forwarding path to the second forwarding path comprises:

if there is no other multicast PW in the multicast PW table that belongs to the same multicast PW group as the first multicast PW corresponding to the first forwarding path, changing the multicast replication mode of the service instance to the head-end replication mode; and
deleting the first multicast PW table entry of the first multicast PW corresponding to the first forwarding path from the multicast PW table.

8. The method of claim 7, further comprising, after convergence of network topology following a link failure in the first forwarding path;
generating new unicast PW table entries for each B-VLAN of the service instance and a new multicast PW table entry for the main B-VLAN; and
updating the unicast PW table by replacing existing unicast PW table entries with the new unicast PW table entries of each B-VLAN, and updating the multicast PW table by replacing an existing multicast PW table entry with the new multicast PW table entry of the main B-VLAN; and
performing:
if one of the new unicast and multicast PW table entries is identical to the second unicast PW table entry or a multicast PW table entry of the second forwarding path, issuing the new unicast PW table entries except for the identical one to the unicast PW table, setting the new unicast PWs entries to receive but not send packets, and updating the multicast PW table with the new multicast PW table entry of the main B-VLAN; or
if one of the new unicast and multicast PW table entries is identical to the unicast or the multicast PW table entry of the second forwarding path, updating the unicast PW table with the new unicast PW table entries after a time period, and updating the multicast PW table with the new multicast PW table entry.

9. A Backbone Edge Bridge (BEB) device comprising:
a processor; and
a memory storing instructions that when executed by the processor cause the BEB device to:
allocate Backbone VLANs (B-VLANs) allocated to a service instance on the BEB device and map the B-VLANs to different Equal Cost Tree (ECT) algorithms;
calculate a first forwarding path between the BEB device and a remote BEB device for a first B-VLAN allocated to the service instance using a first ECT algorithm and Link State PDU (LSP) information;
calculate a second forwarding path between the BEB device and the remote BEB device for a second B-VLAN allocated to the service instance using a second ECT algorithm and the LSP information;
detect a link failure in the first forwarding path; and
switch a data flow from the first forwarding path to the second forwarding path in response to detecting the link failure in the first forwarding path,
wherein to calculate the first forwarding path and calculate the second forwarding path, the instructions cause the BEB device to:
allocate a unicast Pseudo Wire (PW) group to the remote BEB device;
generate a first unicast PW for the first B-VLAN of the remote BEB device,
generate a second unicast PW for the second B-VLAN of the remote BEB device,
issue a first unicast PW table entry for the first unicast PW to a unicast PW table, the first unicast PW table entry comprising a unicast PW group ID of the unicast PW group,
issue a second unicast PW table entry of the second unicast PW to the unicast PW table, the second unicast PW table entry comprising the unicast PW group ID,
set a first sending and receiving attribute of the first unicast PW, and
set a second sending and receiving attribute of the second unicast PW.

10. The BEB device of claim 9, wherein the instructions further cause the BEB device to:
calculate a first unicast SPT to determine a first egress port to the remote BEB device for the first B-VLAN by using the first ECT algorithm based on the LSP information and assuming the BEB device is a root node; and
calculate a second unicast SPT to determine a second egress port to the remote BEB device for the second B-VLAN by using the second ECT algorithm based on the LSP information and assuming the BEB device is the root node,
wherein the first unicast PW table entry further comprises a first unicast PW ID of the first unicast PW, a first B-VLAN ID of the first B-VLAN, and the first egress port, and the second unicast PW table entry further comprises a second PW ID of the second unicast PW, a second B-VLAN ID of the second B-VLAN, and the second egress port.

11. The BEB device of claim 10, wherein the instructions further cause the BEB device to:
receive a Mac-in-Mac packet from a backbone network, the Mac-in-Mac packet comprising a Backbone Service Identifier (I-SID) of the service instance, the first B-VLAN ID of the first B-VLAN, a first Backbone Source MAC address (B-SMAC) corresponding to the remote BEB device, and a source Customer MAC address (C-MAC);
store the source C-MAC address in a C-MAC address table entry in a C-MAC address table of the service instance;
set a third egress port of the C-MAC address table entry in the C-MAC address table to the unicast PW group of the first unicast PW;
receive a user packet from a user network at an ingress port, the user packet comprising a destination C-MAC address;
determine the ingress port corresponds to the service instance; and
search the C-MAC address table of the service instance to determine that the C-MAC address table entry include the destination C-MAC address in the user packet;
if the third egress port in the C-MAC address table entry is set to the unicast PW group and the first unicast PW is the only unicast PW in the unicast PW table that is set to send and receive packets, perform Mac-in-Mac encapsulation on the user packet by using the I-SID, a second B-SMAC corresponding to the BEB device, a Backbone Destination MAC address (B-DMAC) that is the same as the first B-SMAC corresponding to the remote BEB device, and the first B-VLAN ID in the first unicast PW table entry of the first unicast PW in the unicast PW table; and
if the third egress port in the C-MAC address table entry is set to the unicast PW group and at least two unicast PWs in the unicast PW group are to send and receive packets, performing Mac-in-Mac encapsulation on the user packet by using the I-SID, the second B-SMAC, the B-DMAC, and the first B-VLAN in the first unicast PW table entry of the first PW in the unicast PW table;

select the first unicast PW from the first and the second unicast PWs in the unicast PW group based on a load-balancing rule; and send the Mac-in-Mac encapsulated user packet obtained via the first egress port of the first unicast PW.

12. The BEB device of claim 11, wherein the instructions further cause the BEB device to:

set the first unicast PW entry for the first unicast PW in the unicast PW table to receive but not send packets;

modify any other unicast PW that belongs to the same unicast PW group as the first unicast PW and is set to receive but not send packets to send and receive packets.

13. The BEB device of claim 10, wherein the instructions further cause the BEB device to:

allocate a multicast PW group to the service instance;

calculate a first multicast SPT to determine a third egress port to the remote BEB device for the first B-VLAN of the remote BEB device by using the first ECT algorithm based on the LSP information and assuming the remote BEB device is the root node;

generate a first multicast PW for the first B-VLAN;

issue a first multicast PW table entry of the first multicast PW for the first B-VLAN to the multicast PW table, wherein the first B-VLAN is a main B-VLAN and the first multicast PW table entry comprises a multicast PW group ID of the multicast PW group, a first multicast PW ID of the first multicast PW, the first B-VLAN ID of the first B-VLAN, and the third egress port; and set the first multicast PW to send but not receive packets.

14. The BEB device of claim 13, wherein the instructions further cause the BEB device to:

receive a user packet from a user network, the user packet being one of a broadcast packet, a multicast packet, and a unicast packet, the unicast packet having a destination C-MAC address that is unknown;

if a multicast replication mode of the service instance is in a tandem replication mode and the first multicast PW is an only multicast PW in the multicast PW group of the service instance to send but not receive packets, perform Mac-in-Mac encapsulation on the user packet by using an I-SID of the service instance, a Backbone Source MAC address (B-SMAC) corresponding to the BEB, a Backbone Destination MAC address (B-DMAC) corresponding to a multicast address, and the first B-VLAN ID in the first multicast PW table entry of the first multicast PW in the multicast PW table; and send the Mac-in-Mac encapsulated user packet via the third egress port of the first multicast PW;

if the multicast replication mode of the service instance is in the tandem replication mode and at least two multicast PWs in the multicast PW group of the service instance are set to send but not receive packets, perform Mac-in-Mac encapsulation on the user packet using the I-SID of the service instance, the B-SMAC, the B-DMAC, and the first B-VLAN in the first multicast PW table entry of the first multicast PW in the multicast table;

select the first multicast PW from the at least two multicast PWs in the multicast PW group of the service instance based on a load-balancing rule;

send the Mac-in-Mac encapsulated user packet via the third egress port of the first multicast PW;

if the multicast replication mode of the service instance is in a head-end replication mode, for each unicast PW group of the service instance, perform Mac-in-Mac encapsulation on a copy of the user packet by using the I-SID, the B-SMAC, and a respective B-DMAC and a respective B-VLAN ID of a particular unicast PW that is in the respective unicast PW group and is to send and receive packets; and send the Mac-in-Mac encapsulated copy of the user packet via a respective egress port of the particular unicast PW; and if at least two unicast PWs in the unicast PW group are set to send and receive packets, select the particular unicast PW from the at least two unicast PWs based on a second load-balancing rule.

15. The BEB device of claim 14, wherein the instructions further cause the BEB device to:

if there is no other multicast PW in the multicast PW table that belongs to the same multicast PW group as the first multicast PW corresponding to the first forwarding path, change the multicast replication mode of the service instance to the head-end replication mode; and delete the first multicast PW table entry of the first multicast PW corresponding to the first forwarding path from the multicast PW table.

* * * * *